United States Patent [19]

Yamaki

[11] Patent Number: 5,522,062
[45] Date of Patent: May 28, 1996

[54] PERSONAL COMPUTER FOR ACCESSING TWO TYPES OF EXTENDED MEMORIES HAVING DIFFERENT MEMORY CAPACITIES

[75] Inventor: Kazunori Yamaki, Tokyo, Japan

[73] Assignee: Kabushiki Kaisha Toshiba, Kawasaki, Japan

[21] Appl. No.: 166,987

[22] Filed: Dec. 16, 1993

Related U.S. Application Data

[63] Continuation of Ser. No. 571,981, Aug. 24, 1990, abandoned.

[30] Foreign Application Priority Data

Sep. 29, 1989 [JP] Japan .................................. 1-254949
Sep. 29, 1989 [JP] Japan .................................. 1-254966

[51] Int. Cl.$^6$ .................................................. G06F 12/00
[52] U.S. Cl. ................................ 395/497.03; 364/DIG. 1
[58] Field of Search .................................. 395/425, 500, 395/497.01, 497.03, 500

[56] References Cited

U.S. PATENT DOCUMENTS

| Re. 31,318 | 7/1983 | Kaufman et al. .......................... 395/411 |
|---|---|---|
| 4,001,786 | 1/1977 | Boehm . |
| 4,281,392 | 7/1981 | Grants et al. . |
| 4,484,273 | 11/1984 | Stiffler et al. . |
| 4,556,953 | 12/1985 | Caprio et al. . |
| 4,571,676 | 2/1986 | Mantellina et al. ................ 395/497.03 |
| 4,608,631 | 8/1986 | Stiffler et al. . |
| 4,609,996 | 9/1986 | Kummer . |
| 4,731,738 | 3/1988 | Fisher et al. . |
| 4,744,025 | 5/1988 | Lipcon et al. . |
| 4,787,060 | 11/1988 | Boudreau et al. ................. 395/497.03 |
| 4,809,234 | 2/1989 | Kuwashiro . |
| 4,825,404 | 4/1989 | Theus . |
| 4,899,272 | 2/1990 | Fung et al. .......................... 365/230.03 |
| 4,905,182 | 2/1990 | Fitch et al. .............................. 395/282 |
| 4,926,314 | 5/1990 | Dhuey . |
| 4,949,298 | 8/1990 | Nakanishi et al. . |
| 4,951,248 | 8/1990 | Lynch ....................................... 395/402 |
| 4,980,850 | 12/1990 | Morgan .............................. 395/497.03 |
| 5,003,506 | 3/1991 | Itaya . |
| 5,012,408 | 4/1991 | Conroy . |
| 5,027,313 | 6/1991 | Culley . |
| 5,040,153 | 8/1991 | Fung et al. .......................... 365/230.03 |
| 5,042,003 | 8/1991 | Belt et al. . |
| 5,056,060 | 10/1991 | Fitch et al. ............................... 395/823 |
| 5,129,069 | 7/1992 | Helm et al. ......................... 395/497.03 |
| 5,138,705 | 8/1992 | Lo et al. .................................... 395/402 |
| 5,155,844 | 10/1992 | Cheng et al. ....................... 395/183.12 |
| 5,175,835 | 12/1992 | Beighe et al. ...................... 395/421.02 |
| 5,179,686 | 1/1993 | White ................................. 395/497.03 |

FOREIGN PATENT DOCUMENTS

| 0080626 | 6/1983 | European Pat. Off. . |
|---|---|---|
| 0285986 | 12/1988 | European Pat. Off. . |
| 2204163 | 11/1988 | United Kingdom . |
| 2204721 | 11/1988 | United Kingdom . |
| 2226667 | 7/1990 | United Kingdom . |
| 2228112 | 8/1990 | United Kingdom . |

OTHER PUBLICATIONS

Article 96(2) and Rule 51(2) EPC communication from European Patent Office.

*Primary Examiner*—William M. Treat
*Attorney, Agent, or Firm*—Finnegan, Henderson, Farabow, Garrett & Dunner

[57] ABSTRACT

A personal computer includes a connector to which first or second extended memory having different memory capacities is connected. The personal computer further includes a chip type register for storing identification information indicating which of the first and second extended memories is connected to the connector, an address range generation circuit for deriving an address range designated by each row address strobe signal based on the identification information, and a circuit for detecting a row address strobe signal which designates an address range to which the value of a memory address for accessing the first or second extended memory belongs, and activating the detected row address strobe signal.

14 Claims, 10 Drawing Sheets

| | | | |
|---|---|---|---|
| RAS$_0$ { 61 | DRAM 1 (256K × 4bit) | DRAM 2 (256K × 4bit) | 100000$_H$ / 62 / 13FFFF$_H$ |
| 63 | DRAM 3 (256K × 4bit) | DRAM 4 (256K × 4bit) | 140000$_H$ / 64 / 17FFFF$_H$ |
| RAS$_1$ { 65 | DRAM 5 (256K × 4bit) | DRAM 6 (256K × 4bit) | 180000$_H$ / 66 / 1BFFFF$_H$ |
| 67 | DRAM 7 (256K × 4bit) | DRAM 8 (256K × 4bit) | 1C0000$_H$ / 68 / 1FFFFF$_H$ |
| RAS$_2$ { 69 | DRAM 9 (256K × 4bit) | DRAM 10 (256K × 4bit) | 200000$_H$ / 70 / 23FFFF$_H$ |
| 71 | DRAM 11 (256K × 4bit) | DRAM 12 (256K × 4bit) | 240000$_H$ / 72 / 27FFFF$_H$ |
| RAS$_3$ { 73 | DRAM 13 (256K × 4bit) | DRAM 14 (256K × 4bit) | 280000$_H$ / 74 / 2BFFFF$_H$ |
| 75 | DRAM 15 (256K × 4bit) | DRAM 16 (256K × 4bit) | 2C0000$_H$ / 76 / 2FFFFF$_H$ |

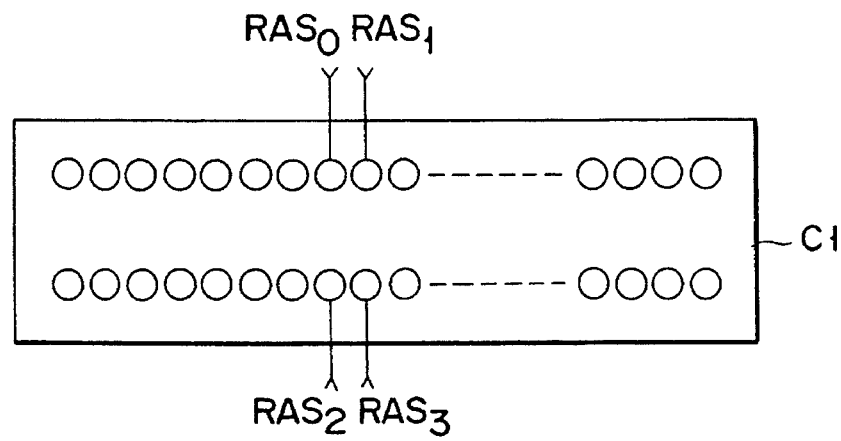
F I G. 4
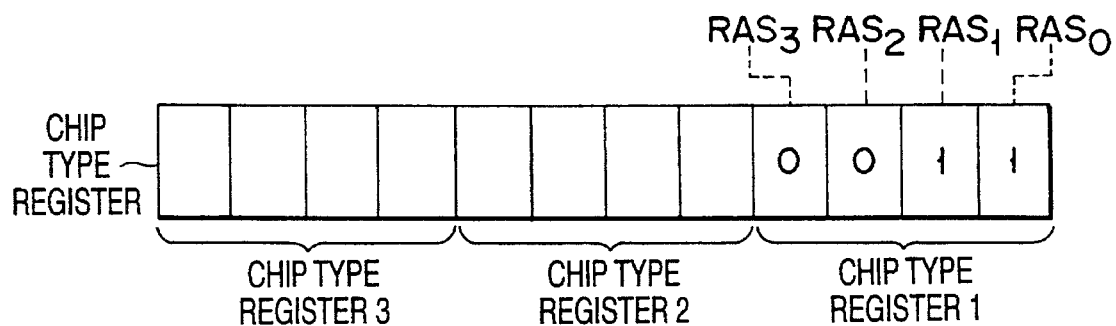
F I G. 5
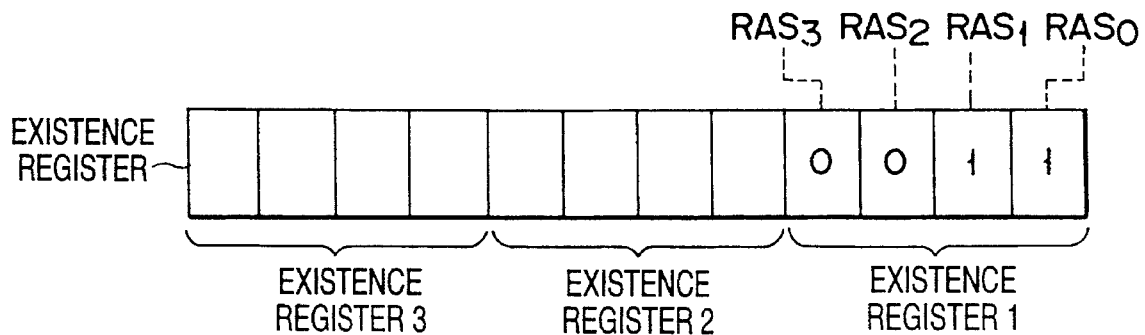
F I G. 6

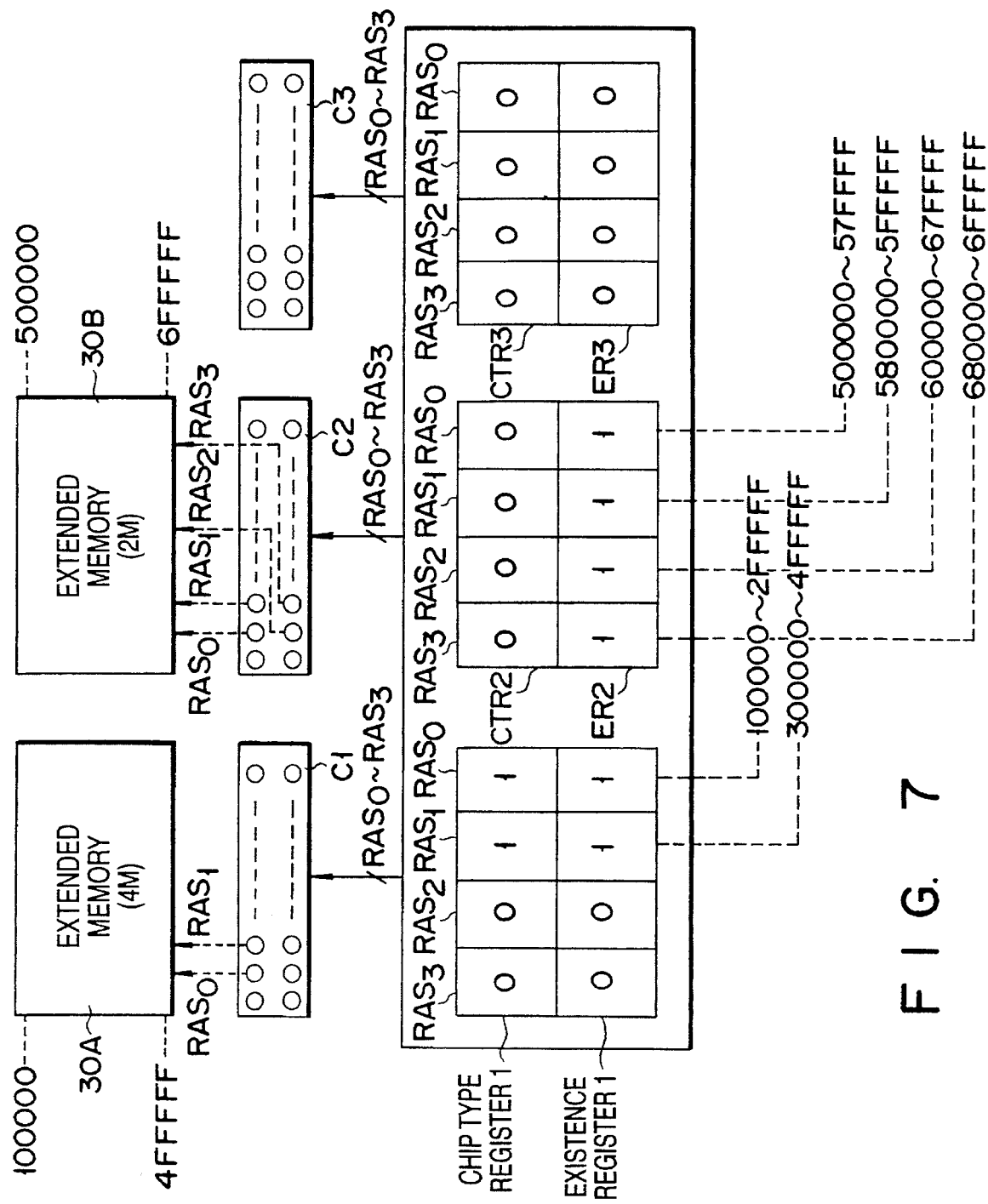
F I G. 7

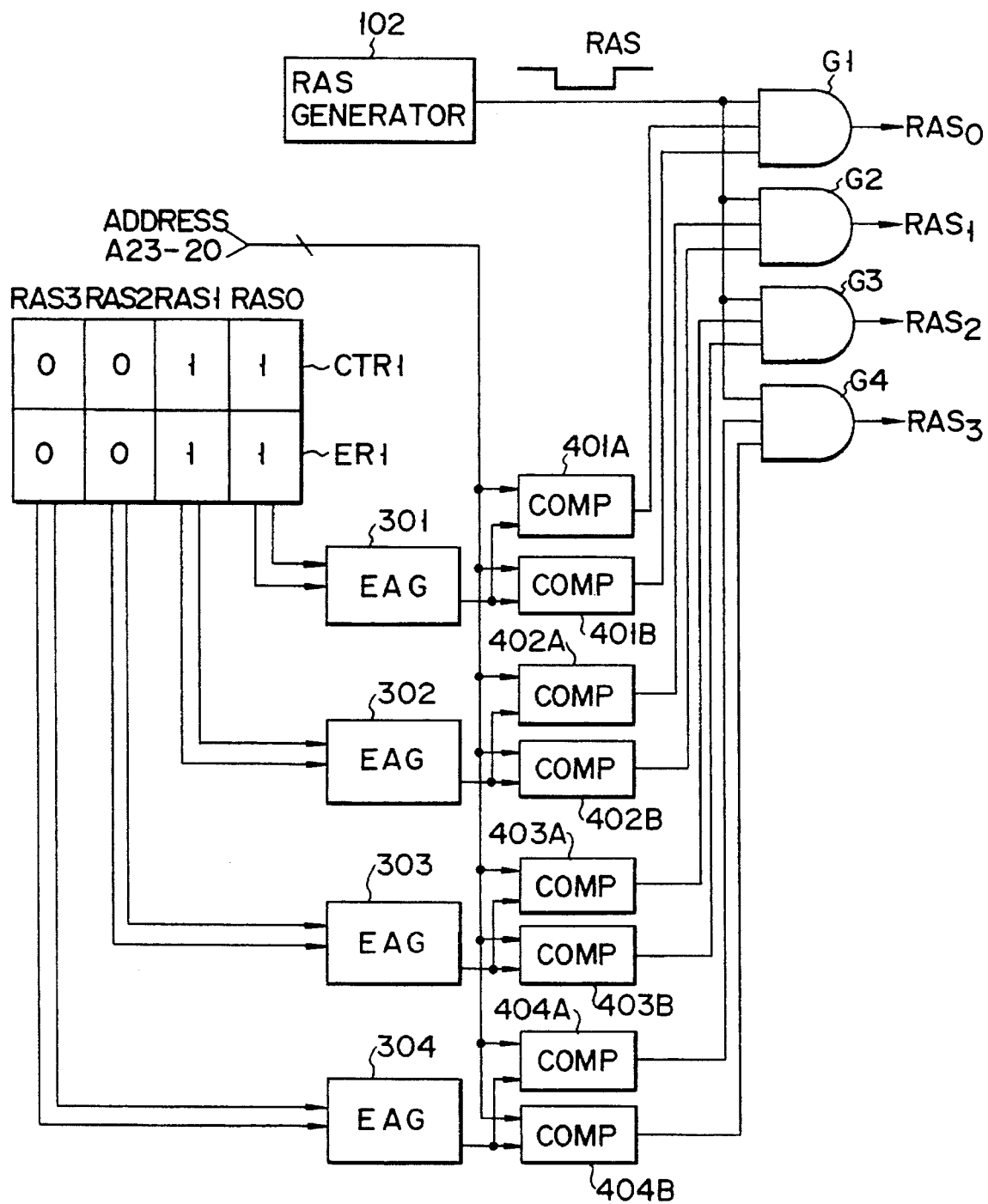
F I G. 9

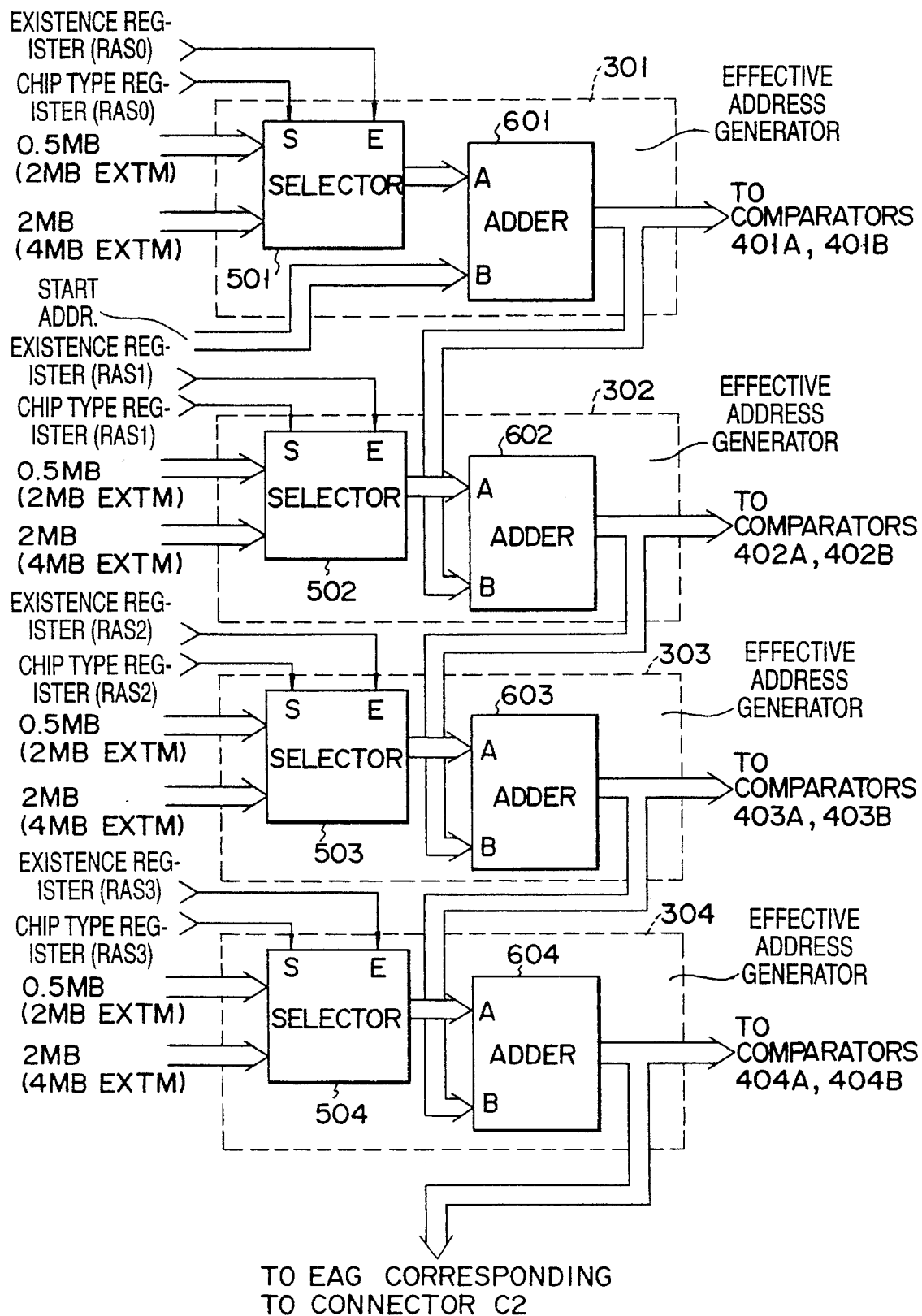
F I G. 10

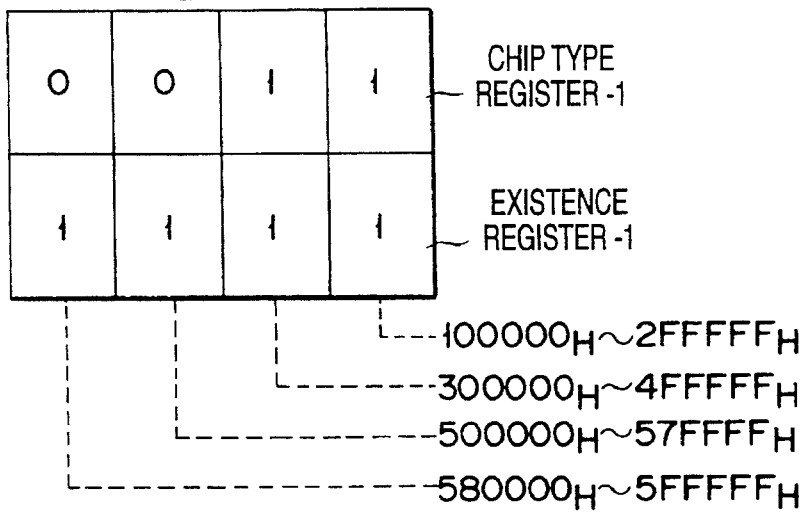

| | 30C | | |
|---|---|---|---|
| 701 | DRAM 1 (1M × 4bit) | DRAM 2 (1M × 4bit) 702 | ---100000H ---1FFFFFH |
| 703 | DRAM 3 (1M × 4bit) | DRAM 4 (1M × 4bit) 704 | ---200000H ---2FFFFFH |
| 705 | DRAM 5 (1M × 4bit) | DRAM 6 (1M × 4bit) 706 | ---300000H ---3FFFFFH |
| 707 | DRAM 7 (1M × 4bit) | DRAM 8 (1M × 4bit) 708 | ---400000H ---4FFFFFH |
| 709 | DRAM 9 (256K × 4bit) | DRAM 10 (256K × 4bit) 710 | ---500000H ---53FFFFH |
| 711 | DRAM 11 (256K × 4bit) | DRAM 12 (256K × 4bit) 712 | ---540000H ---57FFFFH |
| 713 | DRAM 13 (256K × 4bit) | DRAM 14 (256K × 4bit) 714 | ---580000H ---5BFFFFH |
| 715 | DRAM 15 (256K × 4bit) | DRAM 16 (256K × 4bit) 716 | ---5C0000H ---5FFFFFH |

Left labels: $RAS_0$ (701, 703), $RAS_1$ (705, 707), $RAS_2$ (709, 711), $RAS_3$ (713, 715)

FIG. 11

| $RAS_3$ | $RAS_2$ | $RAS_1$ | $RAS_0$ | |
|---|---|---|---|---|
| 0 | 0 | 1 | 1 | CHIP TYPE REGISTER-1 |
| 1 | 1 | 1 | 1 | EXISTENCE REGISTER-1 |

- 100000H ~ 2FFFFFH
- 300000H ~ 4FFFFFH
- 500000H ~ 57FFFFH
- 580000H ~ 5FFFFFH

FIG. 12

PERSONAL COMPUTER FOR ACCESSING TWO TYPES OF EXTENDED MEMORIES HAVING DIFFERENT MEMORY CAPACITIES

This application is a continuation of application Ser. No. 07/571,981, filed Aug. 24, 1990, now abandoned.

BACKGROUND OF THE INVENTION

1. Field of the Invention

This invention relates to a lap-top type personal computer in which an extended memory can be additionally installed, and more particularly, to a lap-top type personal computer for accessing two types of extended memories having different memory capacities, by using identification information set in a register.

2. Description of the Related Art

Recently, so-called lap-top type personal computers have been variously developed as portable type personal computers. This type of personal computer has a connector for connecting an extended memory to the main body of the personal computer in order to enhance the data processing ability thereof. For example, extended memories having a memory capacity of 2 megabytes or 4 megabytes are frequently used as extended memories. In a case where such an extended memory is connected to the connector of a lap-top type personal computer, the internal memory of the personal computer, originally having a memory capacity of 1 megabyte, for example, can be extended to have a memory capacity of 3 or 5 megabytes. Therefore, if the extended memory is used, the user can extend the internal memory capacity of his or her personal computer to a desired memory capacity according to the desired application of the lap-top type personal computer.

However, in order to simplify the address assignment with respect to the extended memory in a normal lap-top type personal computer, the types or the memory capacities of extended memories which can be connected to respective connectors must be determined. That is, an exclusive connector for a 2-megabyte extended memory and an exclusive connector for a 4-megabyte extended memory are separately provided for the personal computer. It is required to connect a 2-megabyte extended memory to a corresponding exclusive connector and a 4-megabyte extended memory to another corresponding exclusive connector. Therefore, when the user connects an extended memory to the lap-top type personal computer, he or she is required to confirm the type of connector or that the connector is a 2-megabyte type or 4-megabyte type before the extended memory is actually connected to the connector, which makes the memory extending operation troublesome.

Further, in a normal lap-top type personal computer, when two or more extended memories are additionally installed, the extended memories must be sequentially connected to the respective connectors so as not to provide an unused connector between any two connectors which are to be used. That is, in a case where two extended memories are additionally installed in the personal computer having three connectors or first to third connectors to which priority levels are assigned in that order, the two extended memories must be connected to the first and second connectors. This is because an address space which follows an address space assigned to the first connector is assigned to the second connector, an address space which follows the address space assigned to the second connector is assigned to the third connector, and if the two extended memories are connected to the first and third connectors without using the second connector, then the address spaces assigned to the two extended memories become discontinuous.

In this way, in the prior art, the memory of a lap-top type personal computer can be extended only in a restricted condition and their is little freedom in extending the memory capacity thereof.

SUMMARY OF THE INVENTION

An object of this invention is to provide a personal computer in which an extended memory can be connected to a desired one of connectors without being restricted by the memory capacity of the extended memory and in which the memory can be freely extended.

According to this invention, there is provided a personal computer which comprises a first extended memory, having a first memory capacity, to which an address space corresponding to the first capacity is assigned, said address space being divided into a plurality of address ranges respectively designated by a plurality of access control signals so as to access an address range corresponding to an activated access control signal; a second extended memory, having a second memory capacity larger than the first memory capacity, to which an address space corresponding to the second capacity is assigned, said address space being divided into a plurality of address ranges respectively designated by a plurality of access control signals so as to access an address range corresponding to an activated access control signal; a connector to which the first or second extended memory can be connected; a first identification information storing section for storing first identification information indicating which of the first and second extended memories is connected to the connector; an address range deriving section for deriving the address range to be designated by each of the access control signals according to the first identification information stored in the first identification storing section; a memory address supplying section for supplying a memory address to a connector section to access the first or second extended memory; and an activation control section for detecting an access control signal which designates the address range to which the value of the memory address belongs and for activating the detected access control signal.

In the above personal computer, it is possible to determine which of the first and second extended memories is connected to the connector by using the first identification information stored in the first identification information storing section. Therefore, irrespective of whether the first or second extended memory is connected to the connector, an address range corresponding to each access control signal can be determined according to the first identification information. As a result, the extended memory can be correctly accessed irrespective of whether the first or second extended memory is connected to the connector by detecting an access control signal which designates an address range to which the memory address for accessing the first or second extended memory belongs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram showing a connector provided in the personal computer shown in FIG. 1;

FIG. 5 is a diagram showing a chip type register provided in the personal computer shown in FIG. 1;

FIG. 6 is a diagram showing an existence register provided in the personal computer shown in FIG. 1;

FIG. 7 is a diagram showing the relationship between the types of extended memories and identification information stored in the chip type register and existence register respectively shown in FIGS. 5 and 6;

FIG. 9 is a block diagram showing a detailed example of the construction of the memory controller shown in FIG. 8;

FIG. 10 is a block diagram showing a detailed example of the construction of an effective address generator provided in the memory controller shown in FIG. 9;

FIG. 11 is a diagram showing a 5-megabyte extended memory additionally installed in the personal computer shown in FIG. 1;

FIG. 12 is a diagram for illustrating identification information stored in the chip type register and existence register when the 5-megabyte extended memory shown in FIG. 11 is connected to the connector of FIG. 4.

DETAILED DESCRIPTION OF THE PREFERRED EMBODIMENT

Figure 1:
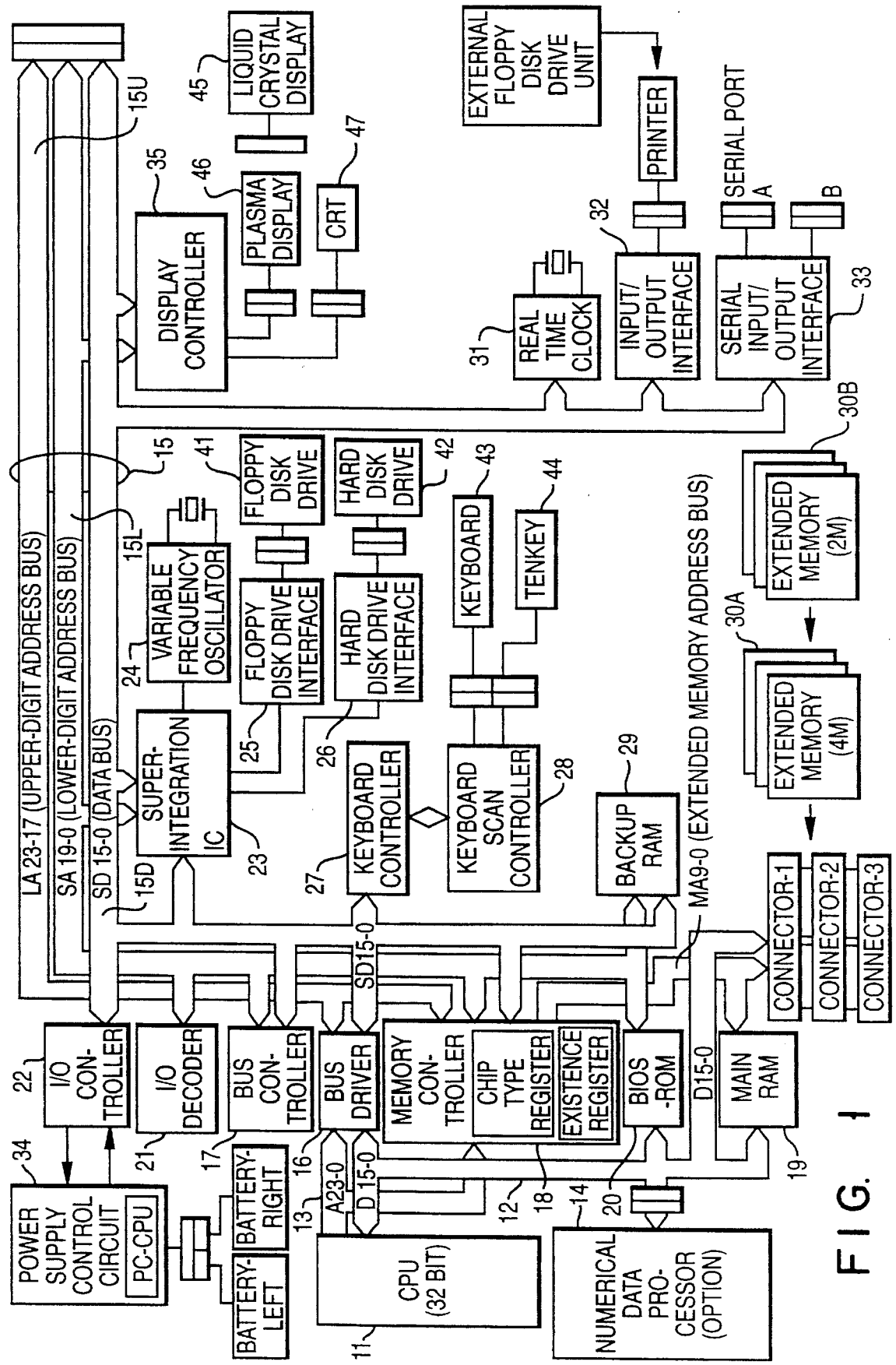
FIG. 1 is a block diagram showing the overall construction of a personal computer according to one embodiment of this invention.

The overall construction of a lap-top type personal computer according to one embodiment of this invention will now be described with reference to FIG. 1.

The personal computer includes a CPU 11, an internal data bus 12 of 6-bit width (D15-0), an internal address bus 13 of 24-bit width (A23-0), a numerical data processor (NDP) 14, and a system bus 15. The CPU 11 is constituted by a 32-bit microprocessor and has an identification processing function for identifying which of a 4-megabyte extended memory 30A and a 2-megabyte extended memory 30B is connected to connectors C1 to C3 and a function of controlling the access with respect to the extended memories 30A and 30B in addition to various data processing functions. The numerical data processor (NDP) 14 is an exclusive processor for numerical processing and can be connected to the internal data bus 12 if required. The system bus 15 is constructed by a data bus 15D of 16-bit width (SD15-0), a lower-digit address bus 15L of 20-bit width (SA19-0) and an upper-digit address bus 15U of 7-bit width (LA23-17).

The personal computer further includes a bus driver (BUS-DRV) 16, a bus controller (BUS-CNT) 17, a memory controller (MEM-CNT) 18, a main memory (I-RAM) 19, a BIOS-ROM 20, an I/O decoder (I/O-DEC) 21 and an I/O controller (I/O-CNT) 22. The bus driver 16 serves as a connection interface between the internal buses 12 and 13 and the system bus 15 and is arranged therebetween. The bus controller 17 is used to control system bus 15. The memory controller 18 effects the read/write control with respect to the main memory 19 and the extended memories 30A and 30B. As will be described later in detail with reference to FIGS. 8, 9 and 10, the memory controller 18 includes a chip type register CTR and an existence register ER for controlling access to the extended memory 30A or 30B connected to any one of the connectors C1 to C3. The chip type register CTR stores identification information indicating that an extended memory mounted on any one of the connectors C1 to C3 is the 4-megabyte extended memory 30A or the 2-megabyte extended memory 30B. The existence register ER stores identification information indicating whether or not one of the 4-megabyte extended memory 30A and the 2-megabyte extended memory 30B is connected to the connectors C1 to C3. The chip type register CTR and existence register ER will be described later in detail with reference to FIGS. 5 and 6.

The main memory (I-RAM) 19 has a memory capacity of 1-megabyte and stores programs necessary for various data processings by the CPU 11 and various data processed by the CPU 11. The BIOS-ROM 20 stores an input/output control program called a basic I/O system. The I/O decoder 21 decodes an I/O address on the system bus 15 and supplies the same to a corresponding I/O device. The I/O controller 22 controls the input/output operation of I/O data.

The personal computer further includes a super-integration IC (SI) 23, a variable frequency oscillator (VFO) 24, a floppy disk drive interface (FDD-I/F) 25, a hard disk drive interface (HDD-I/F) 26, a keyboard controller (KBC) 27, a keyboard scan controller (SCC) 28, a backup RAM (B-RAM) 29 and connectors C1, C2 and C3. The super-integration IC (SI) 23 has a function as a controller for controlling the floppy disk drive interface 25 and the hard disk drive interface 26 and a function as a controller for controlling the direct memory access and interrupt process. The variable frequency oscillator 24 generates a clock for a floppy disk drive (FDD) 41. The floppy disk drive interface 25 is used as an interface with respect to a floppy disk drive (FDD) 41. The hard disk drive interface 26 is used as an interface for a hard disk drive (HDD) 42. The keyboard controller 27 effects a process of reading key data input by means of a keyboard unit 43 and a numerical key pad (ten key) 44, in cooperation with the scan controller 28. The backup RAM 29 is always supplied with a backup power supply voltage and is used to resume functioning and the like. A 4-megabyte extended memory (EXTM) 30A or 2-megabyte extended memory (EXTM) 30B is connected to any one of the connectors C1, C2 and C3 as required, and the constructions of the connectors C1, C2 and C3 and the extended memories 30A and 30B are explained later with reference to FIG. 4 and FIGS. 2A to 3B respectively.

Further, the personal computer includes a real time clock (RTC) 31, an input/output interface (PRT/FDD-IF) 32 for controlling an external printer and an external floppy disk drive unit, a serial input/output interface (SIO) 33, a power supply control circuit (PC) 34, and a display controller (DISP-CNT) 35. The real time clock 31 is a time module having a memory (CMOS-RAM) backed up by an exclusive driving battery. The serial interface 33 iS an input/output interface to which an RS-232C interface device or the like is connected. The power supply control circuit 34 is an intelligent power supply which has a power control CPU (PC-CPU) and to which two main batteries (BT-L, BT-R) can be connected. The display controller 35 is constructed to drive a plasma display (PDP) 46, liquid crystal display (LCD) 45 or CRT display 47.

Next, the construction of the 4-megabyte extended memory 30A shown in FIG. 1 will be explained with reference to FIG. 2A.

Figure 2A:
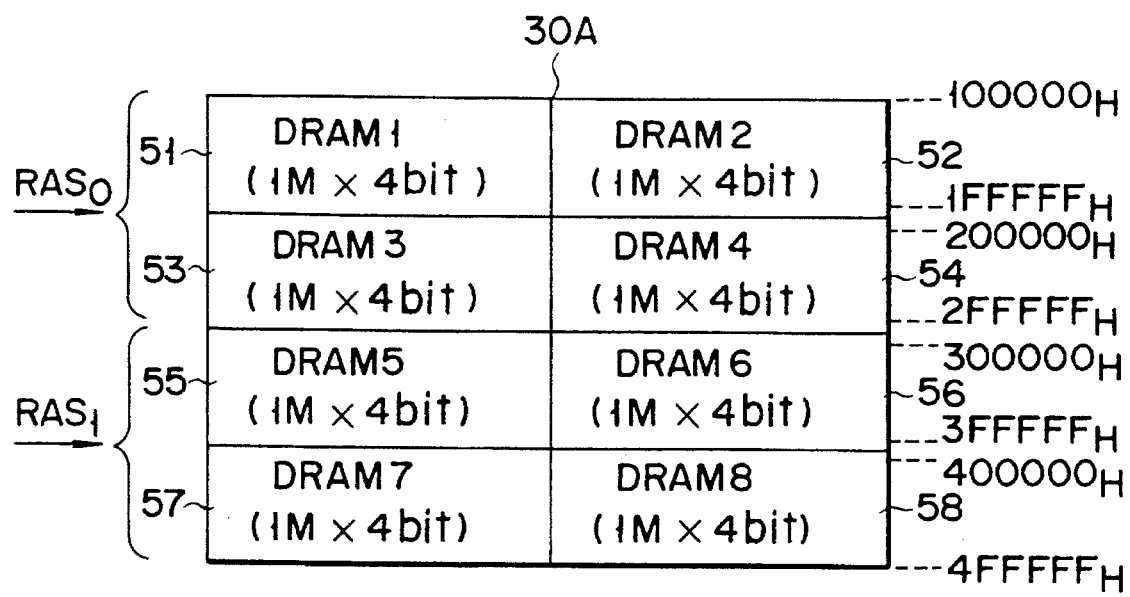
FIGS. 2A and 2B are diagrams showing a 4-megabyte extended memory additionally installed in the personal computer shown in FIG. 1.

As shown in FIG. 2A, the 4-megabyte extended memory 30A is constructed by eight dynamic RAMs (DRAMs) 51 to 58 mounted on a memory board (not shown). Each of the dynamic RAMs 51 to 58 has a 1M×4-bit configuration. A 4-megabyte address space is assigned to the 4-megabyte extended memory 30A as follows.

In this example, it is assumed that the 4-megabyte address space starts at the first megabyte, that is, 100000(H) when represented by the hexadecimal notation. In this case, as shown in FIG. 2A, an address space of 2 megabytes from the address 100000(H) to the address 2FFFFF(H) is assigned to the first to fourth dynamic RAMs 51 to 54 and, in the same manner, an address space of 2 megabytes from the address 300000(H) to the address 4FFFFF(H) is assigned to the fifth to eighth dynamic RAMs 55 to 58.

AS described before, since the internal data bus 12 connected to the connectors C1 to C3 has a 16-bit configuration, access to the extended memory 30A is effected in units of 16 bits. That is, when an address value lying in a range from the address 100000(H) to 2FFFFF(H) is supplied to the extended memory 30A as a write-in or readout address, the first to fourth dynamic RAMs 51 to 54 are accessed at the same time and 4-bit data is written into or read out from each of the dynamic RAMs 51 to 54. In this way, 16-bit data is written in or read out in each access operation. This means that the first to fourth dynamic RAMs 51 to 54 constitute a first access block.

On the other hand, when an address value lying in a range from the address 300000(H) to 4FFFFF(H) is supplied to the extended memory 30A as a write-in or readout address, the fifth to eighth dynamic RAMs 55 to 58 are accessed at the same time and 4-bit data is written into or read out from each of the dynamic RAMs 55 to 58. In this way, 16-bit data is written in or read out in each access operation. This means that the fifth to eighth dynamic RAMs 51 to 58 constitute a second access block.

Thus, since the 4-megabyte extended memory 30A is divided into two access blocks, first and second row address strobe signals RAS0 and RAS1 are used as row address strobe signals (RAS) for controlling access to the dynamic RAMs 51 to 58. The first row address strobe signal RAS0 is used for the first access block constituted by the dynamic RAMs 51 to 54 and is activated when the first access block is accessed. The second row address strobe signal RAS1 is used for the second access block constituted by the dynamic RAMs 55 to 58 and is activated when the second access block is accessed. As a result, whether the first or second access block is selected according to whether the signal RAS0 or RAS1 is activated, and an address to be designated in the selected access block is determined by a 10-bit (MA9-0) row address and 10-bit (MA9-0) column address supplied from the memory controller 18 to the extended memory 30A. The row address and column address are supplied to the extended memory 30A as memory addresses, respectively.

For example, when the signal RAS0 is activated, an address included in the range 100000(H) to 2FFFFF(H), assigned to the first access block, is selected by the row and column memory addresses supplied from the memory controller 18 to the extended memory 30A. On the other hand, when the signal RAS1 is activated, an address included in the range 300000(H) to 4FFFFF(H), assigned to the second access block, is selected by the row and column memory addresses supplied from the memory controller 18 to the extended memory 30A.

That is, in the extended memory 30A, the same repetition address is defined by the 10-bit (MA9-0) row address and 10-bit (MA9-0) column address from the memory controller 18 in the address space from the address 100000(H) to the address 2FFFFF(H) and the address space from the address 300000(H) to the address 4FFFFF(H), and whether the address space from the address 100000(H) to the address 2FFFFF(H) or the address space from the address 300000(H) to the address 4FFFFF(H) is selected is determined according to whether the signal RAS0 or RAS1 is activated.

Figure 2B:
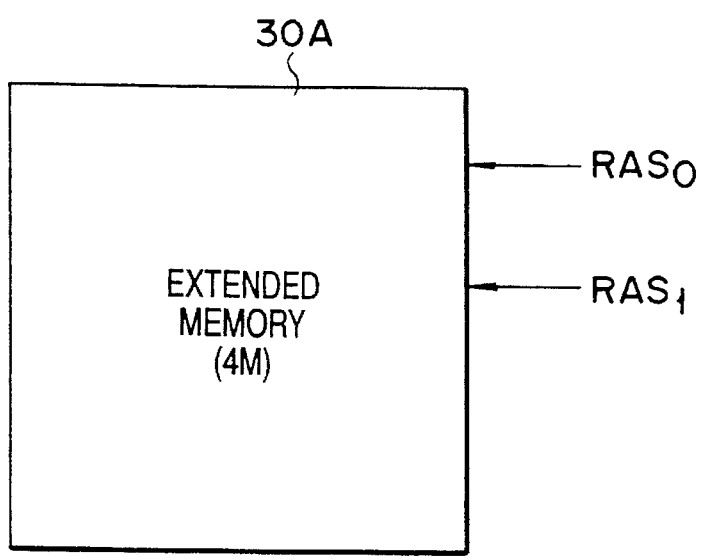

In this way, the 4-megabyte extended memory 30A is constructed so that the address space to be accessed can be designated by the two row address strobe signals RAS0 and RAS1, and therefore the extended memory 30A can be schematically shown in FIG. 2B.

Figures 3A, 3B:
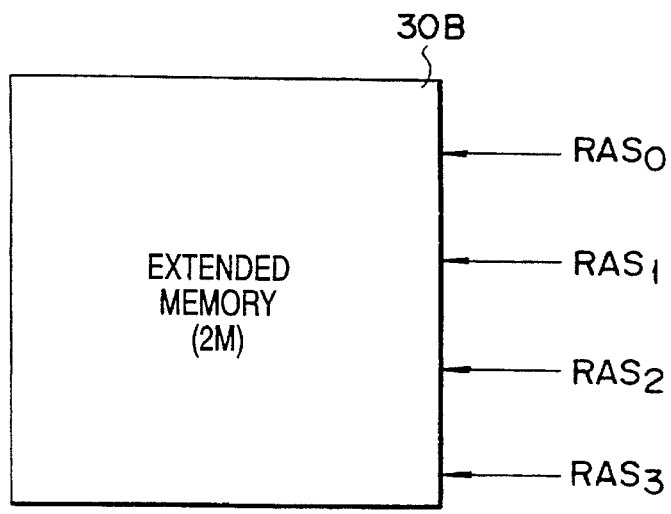
FIGS. 3A and 3B are diagrams showing a 2-megabyte extended memory additionally installed in the personal computer shown in FIG. 1.

FIG. 3A shows the construction of the 2-megabyte extended memory 30B shown in FIG. 1.

As shown in FIG. 3A, the 2-megabyte extended memory 30B is constituted by 16 dynamic RAMs 61 to 76 formed on the memory board (not shown). Each of the dynamic RAMs 61 to 76 has a 256K×4-bit configuration.

A 2-megabyte address space is assigned to the 2-megabyte extended memory 30B as follows.

In this example, it is assumed that a 2-megabyte address space which starts at the first megabyte, that is, 100000(H) when represented by the hexadecimal notation, is assigned to the 2-megabyte extended memory 30B. In this case, as shown in FIG. 3A, an address space of 0.5 megabytes from the address 100000(H) to the address 17FFFF(H) is assigned to the first to fourth dynamic RAMs 61 to 64, and in the same manner, an address space of 0.5 megabytes from the address 180000(H) to the address 1FFFFF(H) is assigned to the fifth to eighth dynamic RAMs 65 to 68. Further, an address space of 0.5 megabytes from the address 200000(H) to the address 27FFFF(H) is assigned to the ninth to twelfth dynamic RAMs 69 to 72, and an address space of 0.5 megabytes from the address 280000(H) to the address 2FFFFF(H) is assigned to the thirteenth to sixteenth dynamic RAMs 73 to 76.

Access to the extended memory 30B is also effected in units of 16 bits. That is, when an address lying in the range from the address 100000(H) to 17FFFF(H) is supplied to the extended memory 30B as a write-in or readout address, four bits of each of the first to fourth dynamic RAMs 61 to 64 are accessed at the same time, thereby permitting 16-bit data to be written in or read out in each access operation. Further, when an address lying in the range from the address 180000(H) to 1FFFFF(H) is supplied to the extended memory 30B as a write-in or readout address, four bits of each of the fifth to eighth dynamic RAMs 65 to 68 are accessed at the same time, thereby permitting 16-bit data to be written in or read out in each access operation. In the same manner, when an address lying in the range from the address 200000(H) to 27FFFF(H) is supplied to the extended memory 30B as a write-in or readout address, four bits of each of the ninth to twelfth dynamic RAMs 69 to 72 are accessed at the same time, and when an address lying in the range from the address 280000(H) to 2FFFFF(H) is supplied to the extended memory 30B as a write-in or readout address, four bits of each of the thirteenth to sixteenth dynamic RAMs 73 to 76 are accessed at the same time.

In this way, the first to fourth dynamic RAMs 61 to 64 constitute a first access block, the fifth to eighth dynamic RAMs 65 to 68 constitute a second access block, the ninth to twelfth dynamic RAMs 69 to 72 constitute a third access block and the thirteenth to sixteenth dynamic RAMs 73 to 76 constitute a fourth access block.

For this reason, four row address strobe signals RAS0 to RAS3 corresponding to the first to fourth access blocks are used as row address strobe signals (RAS) for controlling access to the dynamic RAMs 61 to 76. Further, the same repetition addresses are defined by a 10-bit (MA9-0) row address and a 10-bit (MA9-0) column address supplied from the memory controller 18 to the extended memory 30B in the address spaces (corresponding to the addresses 100000(H) to 1FFFFF(H)) of the first and second access blocks and the address spaces (corresponding to the addresses 200000(H) to 2FFFFF(H)) of the third and fourth access blocks.

Therefore, when the signals RAS0 or RAS1 is activated, an address in the range from the address 100000(H) to the address 1FFFFF(H) is selected by the row and column memory addresses supplied from the memory controller 18, and when the signals RAS2 or RAS3 is activated, an address in the range from the address 200000(H) to the address 2FFFFF(H) is selected by the row and column memory addresses supplied from the memory controller 18.

In this way, the 2-megabyte extended memory 30B is so constructed that the address space to be accessed can be designated by four row address strobe signals RAS0, RAS1, RAS2 and RAS3, and therefore the extended memory 30B can be schematically shown in FIG. 3B.

FIG. 4 shows an example of a connector C1 for the extended memory shown in FIG. 1. As shown in FIG. 4, the connector C1 includes four slots for receiving the four row address signals RAS0 to RAS3 supplied from the memory controller 18 so as to be connected with either one of the 4-megabyte extended memory 30A shown in FIGS. 2A and 2B and the 2-megabyte extended memory 30B shown in FIGS. 3A and 3B. The connectors C2 and C3 have substantially the same construction as the connector C1 shown in FIG. 4, and each of the connectors C2 and C3 has four slots to receive the four row address signals RAS0 to RAS3.

Next, the construction of the chip type register CTR and existence register ER provided in the memory controller 18 are explained with reference to FIGS. 5 and 6.

In FIG. 5, the construction of the chip type register CTR is shown. The chip type register CTR stores identification data indicating for each of signals RAS0 to RAS3 whether the memory chip of a dynamic RAM constituting the extended memory connected to each of the connectors C1 to C3 is of 1M×4-bit configuration or 256K×4-bit configuration in order to identify whether an extended memory connected to each of the connectors C1 to C3 is a 4-megabyte extended memory 30A or 2-megabyte extended memory 30B. In this case, data "1" indicates a dynamic RAM of 1M×4-bit configuration and data "0" indicates a dynamic RAM of 256K×4-bit configuration. The content of identification data stored in the chip type register CTR, that is, data "1" or "0" is determined by the identification process effected by the CPU 11. The identification process is explained later in detail with reference to FIG. 13.

The chip type register CTR is formed of 12-bit configuration obtained by a 4-bit register section CTR1 corresponding to the connector C1, a 4-bit register section CTR2 corresponding to the connector C2 and a 4-bit register section CTR3 corresponding to the connector C3. However, in practice, the chip type register CTR is constructed by two 8-bit type registers. In this case, the register is of 16-bit configuration in total, but only 12 bits are used, the other 4 bits remaining unused.

For example, in a case wherein the 4-megabyte extended memory 30A shown in FIG. 2A is connected to the connector C1, data "1" is set into those bits of the register section CTR1 which correspond to RAS0 and RAS1 as shown in the drawing. This is because the 4-megabyte extended memory 30A is constituted by dynamic RAMs of 1M×4-bit configuration, the access operation of the 4-megabyte extended memory 30A is controlled by the two row address strobe signals RAS0 and RAS1, and the signals RAS2 and RAS3 are not used. In this case, those bits of the register section CTR1 which correspond to RAS2 and RAS3 are originally unstable, but in practice, the bits are set to data "0" instead of being set unstable.

The construction of the existence register ER is shown in FIG. 6. The existence register ER stores identification data for identifying for each of control signals RAS0 to RAS3 whether or not the extended memory is connected to the connector, and when the extended memory is connected, data "1" is stored and when the extended memory is not connected, data "0" is stored.

The existence register ER is formed in a 12-bit configuration obtained by a 4-bit register section ER1 corresponding to the connector C1, a 4-bit register section ER2 corresponding to the connector C2 and a 4-bit register section ER3 corresponding to the connector C3, but in practice, it is formed of two 8-bit type registers. In this case, the register has a 16-bit configuration in total, 12 bits of which are used, the remaining 4 bits not being used.

For example, in a case where the 4-megabyte extended memory 30A is connected to the connector C1, the two address strobe signals RAS0 and RAS1 are used for the 4-megabyte extended memory 30A and neither the signal RAS2 nor the signal RAS3 is used as described before, and therefore, as shown in the drawing, data "1" is set in those bits of the register section ER1 which correspond to the signals RAS0 and RAS1 and data "0" is set in those bits which correspond to the signals RAS2 and RAS3.

FIG. 7 shows the relationship between the types of extended memories connected to the connectors C1 to C3 and the contents of the chip type register CTR and existence register ER.

In this example, the 4-megabyte extended memory 30A is connected to the connector C1, the 2-megabyte extended memory 30B is connected to the connector C2, and no extended memory is connected to the connector C3. In this case, in the chip type register section CTR1 corresponding to the connector C1, data "1" is set in the bits corresponding to RAS0 and RAS1 as described before and data "0" is set in the bits corresponding to RAS2 and RAS3. Likewise, in the existence register section ER1 corresponding to the connector C1, data "1" is set in the bits corresponding to RAS0 and RAS1 as described before and data "0" is set in the bits corresponding to RAS2 and RAS3.

Further, in the chip type register CTR2 corresponding to the connector C2, since the 2-megabyte extended memory 30B is constituted by dynamic RAMs of 256×4-bit configuration, and the 2-megabyte extended memory 30B uses all four signals RAS0 to RAS3, data "0" representing the 256K×4-bit memory chip is set in all of the bits corresponding to the four control signals RAS0 to RAS3 as shown in the drawing. Further, in the existence register section ER2 corresponding to the connector C2, data "1" is set in all of the bits corresponding to RAS0, RAS1, RAS2 and RAS3 as shown in the drawing.

Further, since no extended memory is connected to the connector C3, data "0" is set in all of the bits corresponding to the four signals RAS0 to RAS3 in the existence register section ER3 corresponding to the connector C3. Since no extended memory is connected to the connector C3, all of the bits corresponding to the four control signals RAS0 to RAS3 are unstable in the chip type register section CTR3 corresponding to the connector C3 and data "0" is set in all of these bits as shown in the drawing, for example.

In the condition where the chip type register CTR and existence register ER are set to have the above-described contents, if the priority is set in the order of the connectors C1 to C3, a 2-megabyte address space from the address 100000(H) to the address 2FFFFF(H) is assigned to the signal RAS0 corresponding to the connector C1 as effective address range and a 2-megabyte address space from the address 300000(H) to the address 4FFFFF(H) is assigned to the signal RAS1 corresponding to the connector C1 as effective address range. That is, when the extended memory is accessed by an address in the range from the address 100000(H) to the address 2FFFFF(H), the signal RAS0 corresponding to the connector C1 is activated. Further, when the extended memory is accessed by an address in the range from the address 300000(H) to the address 4FFFFF(H), the signal RAS1 corresponding to the connector C1 is activated.

On the other hand, a 0.5-megabyte address space of the addresses 500000(H) to 57FFFF(H) is assigned as effective address range to the signal RAS0 corresponding to the connector C2. Likewise, a 0.5-megabyte address space of the addresses 580000(H) to 5FFFFF(H) is assigned as effective address range to the signal RAS1 corresponding to the connector C2, a 0.5-megabyte address space of the addresses 600000(H) to 67FFFF(H) is assigned as effective address range to the signal RAS2 corresponding to the connector C2, and a 0.5-megabyte address space of the addresses 680000(H) to 6FFFFF(H) is assigned as effective address range to the signal RAS3 corresponding to the connector C2. That is, when the extended memory is accessed by an address in the range from the address 500000(H) to the address 7FFFF(H), the signal RAS0 corresponding to the connector C2 is activated. Further, when the extended memory is accessed by an address in the range from the address 580000(H) to the address 5FFFFF(H), the signal RAS1 corresponding to the connector C2 is activated, when the extended memory is accessed by an address in the range from the address 600000(H) to the address 67FFFF(H), the signal RAS2 corresponding to the connector C2 is activated, and when the extended memory is accessed by an address in the range from the address 680000(H) to the address 6FFFFF(H), the signal RAS3 corresponding to the connector C2 is activated.

Figure 8:
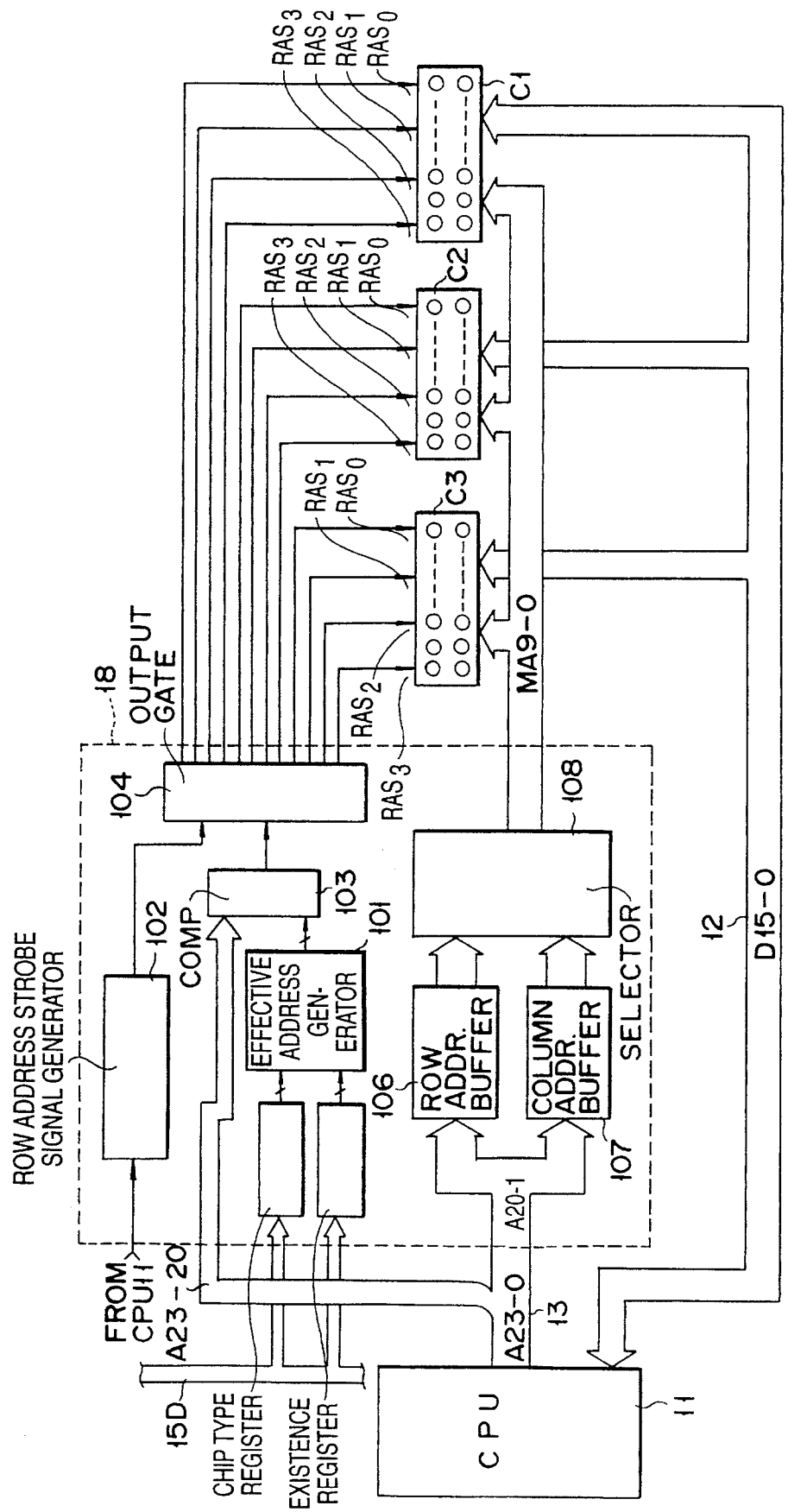
FIG. 8 is a block diagram showing the schematic construction of a memory controller provided in the personal computer shown in FIG. 1.

FIG. 8 shows an example of the construction of the memory controller 18 for controlling generation of the row address strobe signals RAS0 to RAS3 for each of the connectors C1 to C3.

The memory controller 18 includes an effective address generation circuit (EAG) 101, a row address strobe signal (RAS) generator circuit 102, a comparator circuit 103, an output gate circuit 104, a row address buffer 106, a column address buffer 107 and an address selector 108 in addition to the chip type register CTR and the existence register ER.

The chip type register CTR and the existence register ER are accessed for write-in by the CPU 11 via a data bus 15D of the system bus 15, and identification data as described before is stored therein.

The effective address generation circuit (EAG) 101 derives the effective address range of each of the connectors C1 to C3 according to the contents of the chip type register CTR and the existence register ER. The effective address generating circuit 101 derives a 4-megabyte address space from the address 100000(H) to the address 4FFFFF(H) as the effective address range of the connector C1, for example, according to the content "0011" of the chip type register section CTR1, and the content "0011" of the existence register section ER1 explained with reference to FIGS. 5 and 6 when the 4-megabyte extended memory 30A is connected to the connector C1, for example. In practice, the operation of deriving the effective address range is effected for each of the signals RAS0 to RAS3, that is, for each bit of the chip type register section CTR1 and the existence register section ER1. In other words, when the 4-megabyte extended memory 30A is connected to the connector C1, the effective address generation circuit 101 derives the first 2 megabytes of the address 100000(H) to the address 2FFFFF(H) among the 4-megabyte address space as the effective address range corresponding to the signal RAS0 of the connector C1, and derives the remaining 2 megabytes from the address 300000(H) to the address 4FFFFF(H) as the effective address range corresponding to the signal RAS1 of the connector C1, in order to assign an address space of 2 megabytes to each of the two signals RAS0 and RAS1.

Further, when the 4-megabyte extended memory 30A is connected to the connector C1 and the 2-megabyte extended memory 30B is connected to the connector C2, the effective address generation circuit 101 derives a 2-megabyte address space from the address 500000(H) to the address 6FFFFF(H) as the effective address range according to the content "0000" of the chip type register section CTR2 and the content "1111" of the existence register section ER2 corresponding to the connector C2. That is, the effective address generation circuit 101 derives the first 0.5 megabytes of the address 500000(H) to the address 57FFFF(H) among the 2-megabyte address space as the effective address range corresponding to the signal RAS0 of the connector C2, derives the second 0.5 megabytes of the address 580000(H) to the address 5FFFFF(H) as the effective address range corresponding to the signal RAS1 of the connector C2, derives the third 0.5 megabytes of the address 600000(H) to the address 67FFFF(H) as the effective address range corresponding to the signal RAS2 of the connector C2 and derives the remaining 0.5 megabytes from the address 680000(H) to the address 6FFFFF(H) as the effective address range corresponding to the signal RAS3 of the connector C2, in order to assign an address space of 0.5 megabytes to each of the four signals RAS0 to RAS3.

The RAS generator 102 generates a row address strobe signal RAS in response to a memory access instruction from the CPU 11 and supplies the same to the output gate 104.

The address comparator 103 compares the effective address range of each of the signals RAS0 to RAS3 derived for each of the connectors C1 to C3 by the effective address generation circuit 101 with the content of the upper four bits (A23-20) of a 24-bit (A23-0) memory address supplied from the CPU 11. Then, the address comparator 103 detects a signal corresponding to the effective address range to which the value of the upper four bits belong, and supplies a permission signal for permitting activation of the detected signal to the output gate 104.

The output gate circuit 104 controls the supply of the signals RAS0 to RAS3 with respect to the connectors C1 to C3 and generates a row address strobe signal RAS supplied from the RAS generator 102 as a signal which is permitted to be activated by the permission signal from the address comparator 103. For example, when activation of the signal RAS0 of the connector C1 is permitted by the address comparator 103, a row address strobe signal RAS supplied from the RAS generator 102 is supplied to the connector C1 as the signal RAS0.

The row address buffer 106 and column address buffer 107 are supplied with a 10-bit row address and a 10-bit column address, respectively. The 10-bit row address and 10-bit column address are obtained by dividing the lower 20 bits (A19-0) of a 24-bit memory address (A23-0) from the CPU 11. The selector 108 receives the 10-bit row address output from the row address buffer 106 and the 10-bit column address output from the column address buffer 107 and alternately selects the row and column addresses. The row or column address selected by the selector 108 is commonly supplied to the connectors C1 to C3 as a 10-bit memory address (MA9-0).

Next, the construction of each of the effective address generation circuit 101, address comparator 103 and output gate 104 will be explained in detail with reference to FIG. 9.

In FIG. 9, only the construction of each of the effective address generation circuit 101, address comparator 103 and output gate 104 which correspond to the connector C1 are shown.

In FIG. 9, effective address generation units 301 to 304 constitute that portion of the effective address generator 101 of FIG. 8 which corresponds to the connector C1 and derive effective address ranges of the signals RAS0 to RAS3 based on corresponding bit data of the chip type register section CTR1 and existence register section ER1. That is, the effective address generation unit 301 derives effective address range assigned to the signal RAS0 based on data stored in the chip type register section CTR1 and existence register section ER1 corresponding to the signal RAS0. Likewise, the effective address generation units 302, 303 and 304 derive effective address ranges assigned to the respective signals RAS1, RAS2 and RAS3 based on data stored in the chip type register section CTR1 and existence register section ER1 which respectively corresponds to the signals RAS1, RAS2 and RAS3.

Comparator units 401A to 404A and 401B to 404B constitute that portion of the address comparator 103 of FIG. 8 which corresponds to the connector C1, and the comparator units 401A and 401B are associated with the effective address generation unit 301, the comparator units 402A and 402B are associated with the effective address generation unit 302, the comparator units 403A and 403B are associated with the effective address generation unit 303 and the comparator units 404A and 404B are associated with the effective address generation unit 304.

The comparator unit 401A compares the upper four bits (A23-20) of the memory address with the lower limit value of the effective address range corresponding to the signal RAS0 derived by the effective address generation unit 301 or the start address of the effective address range, and generates a signal of logic level "1" when the value of the upper four bits (A23-20) of the memory address is equal to or larger than the start address. The comparator unit 401B compares the upper four bits (A23-20) of the memory address with the upper limit value of the effective address range corresponding to the signal RAS0 derived by the effective address generation unit 301 or the end address of the effective address range, and generates a signal of logic level "1" when the value of the upper four bits (A23-20) of the memory address is equal to or smaller than the end address. Thus, these two comparator units 401A and 401B are used to determine whether or not the value of the upper four bits (A23-20) of the memory address lies within the effective address range corresponding to the signal RAS0 derived by the effective address generation unit 301.

Likewise, whether or not the value of the upper four bits (A23-20) of the memory address lies within the effective address range corresponding to the signal RAS1 derived by the effective address generation unit 302 can be determined by the lower limit comparator unit 402A and upper limit comparator unit 402B, whether or not the value of the upper four bits (A23-20) of the memory address lies within the effective address range corresponding to the signal RAS2 derived by the effective address generation unit 303 can be determined by the lower limit comparator unit 403A and upper limit comparator unit 403B, and whether or not the value of the upper four bits (A23-20) of the memory address lies within the effective address range corresponding to the signal RAS3 derived by the effective address generation unit 304 can be determined by the lower limit comparator unit 404A and upper limit comparator unit 404B.

AND gates G1 to G4 constitute that part of the output gate circuit 104 of FIG. 8 which corresponds to the connector C1 and respectively correspond to the signals RAS0 to RAS3. Each of the AND gates G1 to G4 has three inputs and the first input of each of the AND gates G1 to G4 is commonly supplied with a row address strobe signal RAS generated by the RAS generator 102. The other two inputs of the AND gate G1 are respectively supplied with outputs of the comparator units 401A and 401B. Likewise, the other two inputs of the AND gate G2 are respectively supplied with outputs of the comparator units 402A and 402B, the other two inputs of the AND gate G3 are respectively supplied with outputs of the comparator units 403A and 403B and the other two inputs of the AND gate G4 are respectively supplied with outputs of the comparator units 404A and 404B.

Hence force will be explained the operation of the circuit shown in FIG. 9 effected in a case where the 4-megabyte extended memory 30A is connected to the connector C1, for example.

In a case where the 4-megabyte extended memory 30A is connected to the connector C1, the contents of the chip type register section CTR1 and existence register section ER1 are respectively "0011" and "0011" as shown in FIG. 9. The effective address generation unit 301 derives a 2-megabyte address space from the address 100000(H) to the address 2FFFFF(H), for example, as effective address range of the signal RAS0 based on data "1" stored in the chip type register section CTR1 and corresponding to the signal RAS0 and data "1" stored in the existence register section ER1 and corresponding to the signal RAS0. The start address 100000(H) of the 2-megabyte address space is set in the lower limit comparator unit 401A as its reference value and the end address 2FFFFF(H) of the 2-megabyte address space is set in the upper limit comparator unit 401B as its reference value. The start address of the 2-megabyte effective address range derived by the effective address generation unit 301 is previously determined according to the memory capacity of the main memory (I-RAM) 19 shown in FIG. 1. In this embodiment, since the memory capacity of the main memory 19 is 1 megabyte, the start address of the address space assigned to the extended memory is set to be the first-megabyte address or 100000(H) in order to assign to the extended memory an address space which directly follows a 1-megabyte address space (addresses 000000(H) to 0FFFFF(H)) assigned to the main memory 19.

Like the effective address generation unit 301, the effective address generation unit 302 derives a 2-megabyte address space from the address 300000(H) to the address 4FFFFF(H) as effective address range of the signal RAS1 based on data "1" stored in the chip type register section CTR1 and corresponding to the signal RAS1 and data "1" stored in the existence register section ER1 and corresponding to the signal RAS0. The start address 300000(H) of the 2-megabyte address space is set in the lower limit comparator unit 402A as its reference value and the end address 4FFFFF(H) of the 2-megabyte address space is set in the upper limit comparator unit 402B as its reference value.

The effective address generation units 303 and 304 derive 0 as the effective address ranges corresponding to the signals RAS2 and RAS3 since data corresponding to the signals RAS2 and RAS3 of the existence register section ER1 are "0". That is, no effective address is assigned to the signals RAS2 and RAS3.

In this condition, signals of logic level "1" are output from the comparison units 401A and 401B when the content of the upper four bits (A23-20) of the 24-bit memory address is "0001". This is because the 24-bit memory address having the upper four bits (A23-20) of "0001" takes a value included in the range of the address 100000(H) to the address 1FFFFF(H) and therefore the 24-bit memory address belongs to the effective address range (the range of the address 100000(H) to the address 2FFFFF(H)) of the signal RAS0 derived by the effective address generation unit 301.

As a result, a row address strobe signal RAS generated by the RAS generator 102 is output from the AND gate G1 and the row address strobe signal RAS is supplied to the connector C1 as a signal RAS0. Therefore, the operation of writing data into or reading out data from that address designated by the 10-bit row and 10-bit column addresses (MA0-9) shown in FIG. 8 which is included in the range of the address 100000(H) to the address 2FFFFF(H) of the 4-megabyte extended memory 30A connected to the connector C1 can be effected.

On the other hand, when the content of the upper four bits (A23-20) of the 24-bit memory address is "0011", signals of logic level "1" are output from the comparator units 402A and 402B. This is because the 24-bit memory address having the upper four bits (A23-20) of "0011" takes a value included in the range of the address 300000(H) to the address 3FFFFF(H) and therefore the 24-bit memory address belongs to the effective address range (the range of the address 300000(H) to the address 4FFFFF(H)) of the signal RAS1 derived by the effective address generation unit 302.

As a result, a row address strobe signal RAS generated by the RAS generator 102 is output from the AND gate G2 and the row address strobe signal RAS is supplied to the connector C1 as a signal RAS1. Therefore, the operation of writing data into or reading out data from that address designated by the 10-bit row and 10-bit column addresses (MA0-9) shown in FIG. 8 which is included in the range of the address 300000(H) to the address 4FFFFF(H) of the 4-megabyte extended memory 30A connected to the connector C1 can be effected.

Next, there is explained the operation of the circuit shown in FIG. 9 effected in a case wherein the 2-megabyte extended memory 30B is connected to the connector C1, for example.

In a case where the 2-megabyte extended memory 30B is connected to the connector C1, the effective address generation unit 301 derives a 0.5-megabyte address space from the address 100000(H) to the address 17FFFF(H), for example, as effective address range of the signal RAS0. The start address 100000(H) of the 0.5 -megabyte address space is set into the lower limit comparator unit 401A as its reference value. The end address 17FFFF(H) of the 0.5 -megabyte address space is set in the upper limit comparator unit 401B as its reference value. Further, the effective address generation unit 302 derives a 0.5-megabyte address space from the address 180000(H) to the address 1FFFFF(H) as effective address range of the signal RAS1. The start address 180000(H) of the 0.5-megabyte address space is set in the lower limit comparator unit 402A as its reference value and the end address 1FFFFF(H) of the 0.5-megabyte address space is set in the upper limit comparator unit 402B as its reference value. The effective address generation unit 303 derives a 0.5-megabyte address space from the address 200000(H) to the address 27FFFF(H) as effective address range of the signal RAS2. The start address 200000(H) of the 0.5-megabyte address space is set in the lower limit comparator unit 403A as its reference value and the end address 17FFFF(H) of the 0.5-megabyte address space is set in the upper limit comparator unit 403B as its reference value. The effective address generation unit 304 derives a 0.5-megabyte address space from the address 280000(H) to the address 2FFFFF(H) as effective address range of the signal RAS3. The start address 280000(H) of the 0.5-megabyte address space is set in the lower limit comparator unit 404A as its reference value and the end address 2FFFFF(H) of the 0.5-megabyte address space is set in the upper limit comparator unit 404B as its reference value.

In this condition, signals of logic level "1" are output from the comparison units 401A and 401B and also signals of logic level "1" are output from the comparison units 402A and 402B when the content of the upper four bits (A23-20) of the 24-bit memory address is "0001". This is because the 24-bit memory address having the upper four bits (A20-23) of "0001" takes a value included in the range of the address 100000(H) to the address 1FFFFF(H) and therefore the 24-bit memory address belongs to the effective address range (the range of the address 100000(H) to the address 17FFFF(H)) of the signal RAS0 derived by the effective address generation unit 301 or to the effective address range (the range of the address 180000(H) to the address 1FFFFF(H)) of the signal RAS1 derived by the effective address generation unit 302.

As a result, a row address strobe signal RAS generated by the RAS generator 102 is output from both of the AND gates G1 and G2 and thus the row address strobe signals RAS0 and RAS1 are supplied to the connector C1. Therefore, the operation of writing data into or reading out data from that address designated by the 10-bit row and 10-bit column addresses (MA9-0) shown in FIG. 8 which is included in the range of the address 100000(H) to the address 1FFFFF(H) of the 2-megabyte extended memory 30B connected to the connector C1 can be effected.

On the other hand, when the content of the upper four bits (A23-20) of the 24-bit memory address is "0010", signals of logic level "1" are output from the comparator units 403A and 403B and also signals of logic level "1" are output from the comparison units 404A and 404B. This is because the 24-bit memory address having the upper four bits (A23-20) of "0010" takes a value included in the range of the address 200000(H) to the address 2FFFFF(H) and therefore the 24-bit memory address belongs to the effective address range (the range of the address 200000(H) to the address 27FFFF(H)) of the signal RAS2 derived by the effective address generation unit 303 or to the effective address range (the range of the address 280000(H) to the address 2FFFFF(H)) of the signal RAS3 derived by the effective address generation unit 304.

As a result, a row address strobe signal RAS generated by the BAS generator 102 is output from both of the AND gates G3 and G4 and row address strobe signals RAS2 and RAS3 are supplied to the connector C1. Therefore, the operation of writing data into or reading out data from that address designated by the 10-bit row and 10-bit column addresses (MA0-9) shown in FIG. 8 which is included in the range of the address 200000(H) to the address 2FFFFF(H) of the 2-megabyte extended memory 30B connected to the connector C1 can be effected.

Next, an example of the construction of the effective address generation units 301 to 304 shown in FIG. 9 will be explained in detail with reference to FIG. 10.

The effective address generation unit 301 includes a selector 501 and an adder 601. The selector 501 receives first input data indicating a 0.5-megabyte address range and second input data indicating a 2-megabyte address range, selects one of the first and second input data and supplies the selected data to the first input terminal A of the adder 601. The first input data indicating the 0.5-megabyte address range corresponds to an address space assigned to one signal RAS of the 2-megabyte extended memory 30B, and the second input data indicating the 2-megabyte address range corresponds to an address space assigned to one signal RAS of the 4-megabyte extended memory 30A.

The selection operation of the selector 501 is controlled according to the content of data stored in the chip type register section CTR1 and corresponding to the signal RAS0. That is, when data stored in the chip type register section CTR1 and corresponding to the signal RAS0 is "0", the selector 501 selects the first input data indicating the 0.5-megabyte address range. On the other hand, when data stored in the chip type register section CTR1 and corresponding to the signal RAS0 is "1", the selector 501 selects the second input data indicating the 2-megabyte address range. Further, the selector 501 is also controlled according to the content of data, which corresponds to the signal RAS0, stored in the existence register section ER1. In a case where the data is "1", the selector 501 selects and outputs one of the first and second input data as described above, and when data stored in the existence register section ER1 and corresponding to the signal RAS0 is "0", the selector 501 selects neither the first input data nor the second input data and outputs zero.

The adder 601 has a first input terminal A to which an output of the selector 501 is supplied and a second input terminal B to which a start address is supplied. The start address supplied to the second input terminal B has a predetermined value given by an exclusive register (not shown), for example, and indicates the start address of that effective address range of the connector C1 which corresponds to the signal RAS0. The adder 601 first supplies the start address supplied to the second input terminal B thereof to the lower limit comparator unit 401 shown in FIG. 9 as a reference value for comparison. Then, the adder 601 adds the output of the selector 501 supplied to the first input terminal A and the start address supplied to the second input terminal B. An output of the addition result of the adder 601 indicates the end address of the effective address range corresponding to the RAS0 of the connector C1 and is supplied to the upper limit comparator unit 401B shown in FIG. 9 as its reference value.

The effective address generation unit 302 includes a selector 502 and an adder 602. Like the selector 501, the selector 502 receives first input data indicating a 0.5-megabyte address range and second input data indicating a 2-megabyte address range, selects one of the first and second input data and supplies the selected data to the first input terminal A of the adder 602. The selection operation of the selector 502 is controlled according to the content of data, which corresponds to the signal RAS1 stored in the chip type register section CTR1. That is, when data stored in the chip type register section CTR1 and corresponding to the signal RAS1 is "0", the selector 502 selects the first input data indicating the 0.5-megabyte address range. On the other hand, when data stored in the chip type register section CTR1 and corresponding to the signal RAS1 is "1", the selector 502 selects the second input data indicating the 2-megabyte address range. Further, the selector 502 is also controlled according to the content of data stored in the existence register section ER1 and corresponding to the signal RAS1. In a case where the data is "1", the selector 502 selects and outputs one of the first and second input data as described above, and when data stored in the existence register section ER1 and corresponding to the signal RAS1 is "0", the selector 502 selects neither the first input data nor the second input data and outputs zero.

The adder 602 has a first input terminal A to which an output of the selector 502 is supplied and a second input terminal B to which an output of the addition generation unit 301 is supplied as a start address. The adder 602 first supplies the start address supplied to the second input terminal B thereof to the lower limit comparator unit 402A shown in FIG. 9 as a reference value for comparison. Then, the adder 602 adds an output of the selector 502 supplied to the first input terminal A and a start address supplied to the second input terminal B. An output of the addition result of the adder 602 indicates the end address of the effective address range corresponding to the RAS1 of the connector C1 and is supplied to the upper limit comparator unit 402B shown in FIG. 9 as its reference value.

The effective address generation unit 303 includes a selector 503 and an adder 603. The selector 503 receives first input data indicating a 0.5-megabyte address range and second input data indicating a 2-megabyte address range, selects one of the first and second input data and supplies the selected data to the first input terminal A of the adder 603. The selection operation of the selector 503 is controlled according to the content of data, which corresponds to the signal RAS2, stored in the chip type register section CTR1. That is, when data stored in the chip type register section CTR1 and corresponding to the signal RAS2 is "0", the selector 503 selects the first input data indicating the 0.5-megabyte address range. On the other hand, when data stored in the chip type register section CTR1 and corresponding to the signal RAS2 is "1", the selector 503 selects the second input data indicating the 2-megabyte address range. Further, the selector 503 is also controlled according to the content of data stored in the existence register section ER1 and corresponding to the signal RAS2. In a case where the data is "1", the selector 502 selects and outputs one of the first and second input data as described above, and when data stored in the existence register section ER1 and corresponding to the signal RAS2 is "0", the selector 503 selects neither the first input data nor the second input data and outputs zero.

The adder 603 has a first input terminal A to which an output of the selector 503 is supplied and a second input terminal B to which an output of the addition result of the adder 602 of the effective address generation unit 302 is supplied as a start address. The adder 603 first supplies the start address supplied to the second input terminal B thereof to the lower limit comparator unit 403A shown in FIG. 9 as a reference value for comparison. Then, the adder 603 adds an output of the selector 503 supplied to the first input terminal A and a start address supplied to the second input terminal B. An output of the addition result of the adder 603 indicates the end address of the effective address range corresponding to the RAS2 of the connector C1 and is supplied to the upper limit comparator unit 403B shown in FIG. 9 as its reference value.

The effective address generation unit 304 includes a selector 504 and an adder 604. The selector 504 receives first input data indicating a 0.5-megabyte address range and second input data indicating a 2-megabyte address range, selects one of the first and second input data and supplies the selected data to the first input terminal A of the adder 604. The selection operation of the selector 504 is controlled according to the content of data, which corresponds to the signal RAS3, stored in the chip type register section CTR1. That is, when data stored in the chip type register section CTR1 and corresponding to the signal RAS3 is "0", the selector 504 selects the first input data indicating the 0.5-megabyte address range. On the other hand, when data stored in the chip type register section CTR1 and corresponding to the signal RAS3 is "1", the selector 504 selects the second input data indicating the 2-megabyte address range. Further, the selector 504 is also controlled according to the content of data stored in the existence register section ER1 and corresponding to the signal RAS3. In a case where the data is "1", the selector 502 selects and outputs one of the first and second input data as described above, and when data stored in the existence register section ER1 and corresponding to the signal RAS3 is "0", the selector 502 selects neither the first input data nor the second input data and outputs zero.

The adder 604 has a first input terminal A to which an output of the selector 504 is supplied and a second input terminal B to which an output of the addition result of the adder 603 of the effective address generation unit 303 is supplied as a start address. The adder 604 first supplies the start address supplied to the second input terminal B thereof to the lower limit comparator unit 404A shown in FIG. 9 as a reference value for comparison. Then, the adder 604 adds an output of the selector 504 supplied to the first input terminal A and a start address supplied to the second input terminal B. An output of the addition result of the adder 604 indicates the end address of the effective address range corresponding to the RAS3 of the connector C1 and is supplied to the upper limit comparator unit 404B shown in FIG. 9 as its reference value. Further, the output of addition result of the adder 604 is supplied to the effective address generation unit (not shown) corresponding to the signal RAS0 of the connector C2 as a start address thereof.

In the effective address generation units 301 to 304 shown in FIG. 10, the selectors 501 and 502 select the second input data indicating the 2-megabyte address range when the 4-megabyte extended memory 30A is connected to the connector C1. As a result, a 2-megabyte address space starting from the address of 100000(H) is derived as effective address range of the signal RAS0 by means of the adder 601, for example, and a 2-megabyte address space directly following the effective address range derived by the adder 601 is derived as effective address range of the signal RAS1 by means of the adder 602.

Further, the selectors 501 to 504 each select the first input data indicating the 0.5-megabyte address range when the 2-megabyte extended memory 30B is connected to the connector C1. As a result, a 0.5-megabyte address space starting from the address of 100000(H) is derived as effective address range of the signal RAS0 by means of the adder 601, for example, a 0.5-megabyte address space directly following the effective address range derived by the adder 601 is derived as effective address range of the signal RAS1 by means of the adder 602, a 0.5-megabyte address space directly following the effective address range derived by the adder 602 is derived as effective address range of the signal RAS2 by means of the adder 603, and a 0.5-megabyte address space directly following the effective address range derived by the adder 603 is derived as effective address range of the signal RAS3 by means of the adder 604.

Further, when neither the extended memory 30A nor the extended memory 30B is connected to the connector C1, all of the selectors 501 to 504 output zero. As a result, a start address of 100000(H), for example, supplied to the second input terminal B of the adder 601 is directly output as an addition result of the adder 601 and an effective address range of the signal RAS0 is not derived. Likewise, in the adders 602, 603 and 604, effective address ranges of the signals RAS1, RAS2 and RAS3 are not derived. The addition result output of the adder 604 is supplied to an effective address generation unit (not shown) corresponding to the signal RAS0 of the connector C2 as a start address thereof, and the addition result output of the adder 604 is equal to the start address supplied to the second input terminal B of the adder 601. Therefore, when neither the extended memory 30A nor the extended memory 30B is connected to the connector C1, the start address supplied to the effective address generation unit 301 and corresponding to the connector C1 is used as a start address corresponding to the connector C2 as it is.

As described above, in this embodiment, it is possible to determine which of the 4-megabyte and 2-megabyte extended memories is connected for each of the connectors C1 to C4 by using the identification data set in the chip type register CTR. Therefore, irrespective of whether the 4-megabyte extended memory or the 2-megabyte extended memories is connected, the address ranges to be specified by the signals RAS0 to RAS3 can be determined for each of the connectors C1 to C3, thereby permitting activation of the signals RAS0 to RAS3 to be controlled. As a result, the extended memory can be connected to a desired connector irrespective of the memory capacity.

Further, since the presence or absence of the extended memory can be recognized for each of the connectors C1 to C3 by using the identification data set in the existence register ER, effective addresses can be correctly recognized even when an unused connector exists between the connectors which are actually used. Therefore, even when the 4-megabyte extended memory 30A is connected to the connector C1, the 2-megabyte extended memory 30B is connected to the connector C3 and the connector C2 is not used, for example, the 2-megabyte address space (from the address 500000(H) to the address 6FFFFF(H)) which directly follows the 4-megabyte address space (from the address 100000(H) to the address 400000(H)) assigned to the connector C1 can be assigned to the 2-megabyte extended memory 30B connected to the connector C3 since no effective address range is set for the connector C2. As a result, it becomes possible to connect a plurality of extended memories to the connectors C1 to C3 without defining the connecting positions.

An extended memory whose access operation can be controlled by using the chip type register CTR and the existence register ER is not limited to the above 4-megabyte extended memory 30A and 2-megabyte extended memory 30B. For example, as shown in FIG. 11, the access operation of an extended memory constituted by 1M×4-bit DRAMs and 256K×4-bit DRAMs can be controlled in the same manner as in the extended memories 30A and 30B.

FIG. 11 shows a 5-megabyte extended memory 30C constituted by eight 1M×4-bit DRAMs 701 to 708 and eight 256K×4-bit DRAMs 709 to 716.

In the extended memory 30C, a 2-megabyte address space from the address 100000(H) to the address 2FFFFF(H) is assigned to the first to fourth DRAMs 701 to 704 and the access to the first to fourth DRAMs 701 to 704 is controlled by the signal RAS0. A 2-megabyte address space from the address 300000(H) to the address 4FFFFF(H) is assigned to the fifth to eighth DRAMs 705 to 708 and the access to the fifth to eighth DRAMs 705 to 708 is controlled by the signal RAS1. A 0.5-megabyte address space from the address 500000(H) to the address 57FFFF(H) is assigned to the ninth to twelfth DRAMs 709 to 712 and the access to the ninth to twelfth DRAMs 709 to 712 is controlled by the signal RAS2. Further, a 0.5-megabyte address space from the address 580000(H) to the address 5FFFFF(H) is assigned to the thirteenth to sixteenth DRAMs 713 to 716 and the access to the thirteenth to sixteenth DRAMs 713 to 716 is controlled by the signal RAS3.

When the 5-megabyte extended memory 30C with the above construction is connected to the connector C1, "0011" is set into the chip type register section CTR1 as shown in FIG. 12. This is because blocks to be accessed by the signals RAS0 and RAS1 are each constituted by 1M×4-bit DRAMs and blocks to be accessed by the signals RAS2 and RAS3 are each constituted by 256K×4-bit DRAMs in the 5-megabyte extended memory 30C. When the 5-megabyte extended memory 30C is connected to the connector C1, "1111" is set into the existence register section ER1 as shown in FIG. 12. This is because all of the signals RAS0 to RAS3 are used in the 5-megabyte extended memory 30C.

With the chip type register section CTR1 having "0011" set therein and the existence register section ER1 having "1111" set therein, the effective address generation unit 301 derives a 2-megabyte address space from the address 100000(H) to the address 2FFFFF(H) as an effective address range corresponding to the signal RAS0 of the connector C1. Further, the effective address generation unit 302 derives a 2-megabyte address space from the address 300000(H) to the address 4FFFFF(H) as an effective address range corresponding to the signal RAS1 of the connector C1, the effective address generation unit 303 derives a 0.5-megabyte address space from the address 500000(H) to the address 57FFFF(H) as an effective address range corresponding to the signal RAS2 of the connector C1, and the effective address generation unit 304 derives a 0.5-megabyte address space from the address 580000(H) to the address 5FFFFF(H) as an effective address range corresponding to the signal RAS3 of the connector C1. As a result, when an address lying in the range from the address 100000(H) to the address 2FFFFF(H) of the extended memory 30C is designated to be accessed by a memory address, the signal RAS0 is activated; when an address lying in the range from the address 300000(H) to the address 4FFFFF(H) is designated to be accessed by a memory address, the signal RAS1 is activated; when an address lying in the range from the address 500000(H) to the address 57FFFF(H) is designated to be accessed by a memory address, the signal RAS2 is activated; and when an address lying in the range from the address 580000(H) to the address 5FFFFF(H) is designated to be accessed by a memory address, the signal RAS3 is activated. In this way, since activation of the signals RAS0 to RAS3 can be controlled according to the value of the memory address, the access operation of the 5-megabyte extended memory 30C can be controlled by using the chip type register CTR in the same manner as in the 4-megabyte extended memory 30A and 2-megabyte extended memory 30B.

Figure 13:
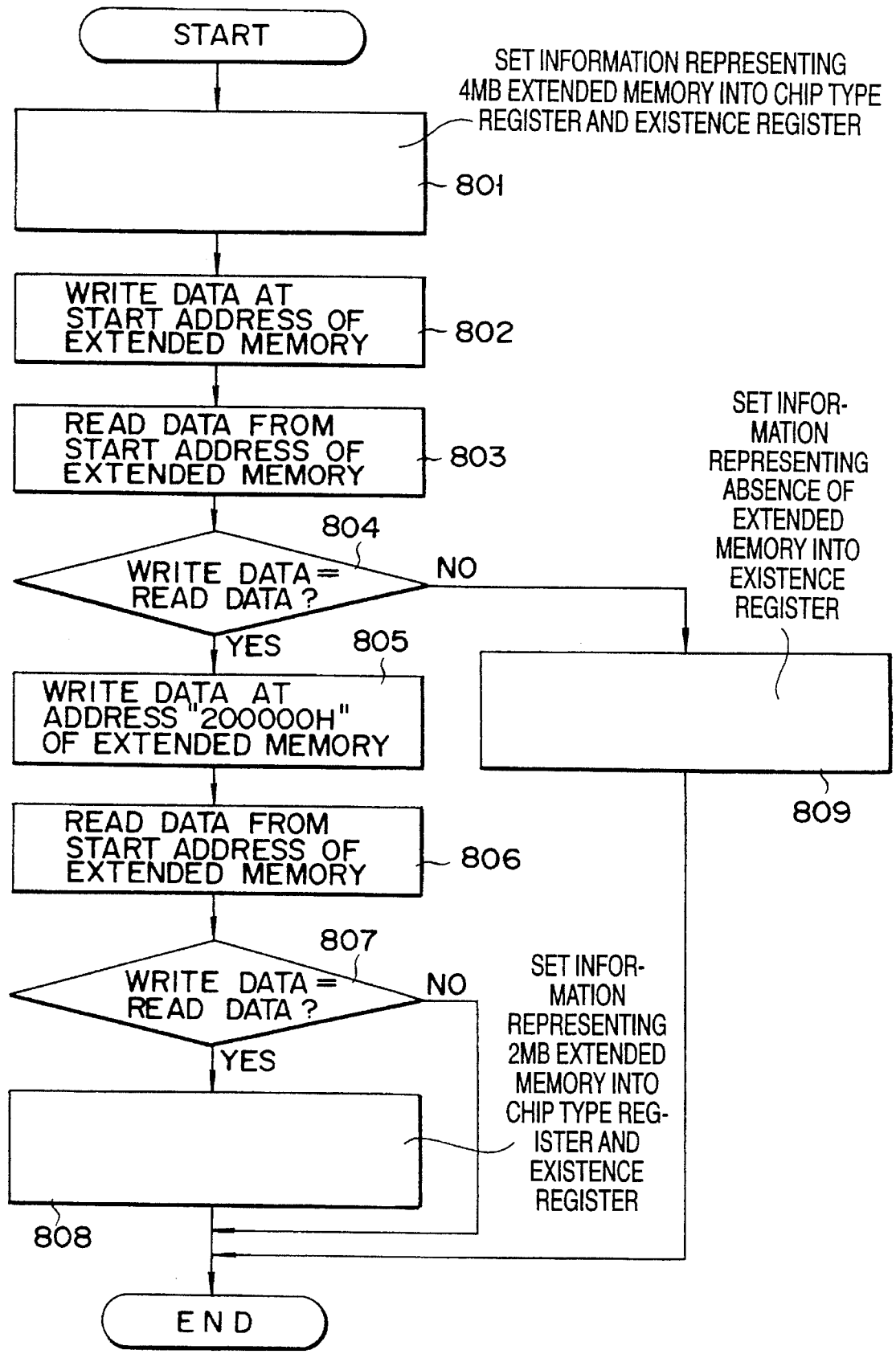
FIG. 13 is a flowchart for illustrating the operation of the identification process effected by the personal computer shown in FIG. 1 to identify the types of extended memories.

Next, there is explained with reference to FIG. 13 the operation of identification process effected by the CPU 11 to determine whether or not an extended memory is connected to each of the connectors C1 to C3 and whether an extended memory detected to be connected to the connector is the 4-megabyte extended memory 30A or 2-megabyte extended memory 30B. In this example, the identification process of the extended memory is explained with respect to the connector Cl.

First, the CPU 11 sets identification information corresponding to one of the extended memories having a larger memory capacity, that is, the 4-megabyte extended memory 30A into the chip type register section CTR1 irrespective of the type of the extended memory connected to the connector C1 in the step 801. In this case, data "1" is set into bits corresponding to the signals RAS0 and RAS1 and data "0" is set into bits corresponding to the signals RAS2 and RAS3 in the chip type register CTR1 as shown in FIG. 5. Further, in the step 801, identification information corresponding to the 4-megabyte extended memory 30A is set into the existence register section ER1. In this case, data "1" is set into bits corresponding to the signals RAS0 and RAS and data "0" is set into bits corresponding to the signals RAS2 and RAS3 in the existence register ER1 as shown in FIG. 6. By the process of the step 801, only the signals RAS0 and RAS1 are permitted to be activated, and activation of the signals RAS2 and RAS3 is inhibited. In this case, the first half of 2 megabytes in the 4-megabyte address space is assigned to the signal RAS0 as an effective address range and the latter half of 2 megabytes thereof is assigned to the signal RAS1 as an effective address range. For example, when the start address of the 4-megabyte address space is 100000(H), 2-megabyte address space from 100000(H) to 2FFFFF(H) is assigned to the signal RAS0 and 2-megabyte address space from 300000(H) to 4FFFFF(H) is assigned to the signal Next, the CPU 11 effects the write-in access to write preset data into the start address, for example, the address 100000(H) of the extended memory connected to the connector C1 in cooperation with the memory controller 18 in the step 802. Then, in the step 803, the CPU 11 effects the readout access to read out data from the start address of the extended memory. After this, in the step 804, the CPU 11 compares the write-in data to be written into the address 100000(H) in the write-in access operation in the step 802 with the readout data read out in the readout access operation in the step 803.

If an extended memory is connected to the connector C1, data can be written into the start address 100000(H) irrespective of whether the extended memory is the 4-megabyte extended memory 30A or the 2-megabyte extended memory 30B. This is because the start address 100000(H) of the extended memory lies in the effective address range from the address 100000(H) to 2FFFFF(H) assigned to the signal RAS0 in either one of the 4-megabyte extended memory 30A and the 2-megabyte extended memory 30B. Therefore, if either one of the 4-megabyte extended memory 30A and the 2-megabyte extended memory 30B is connected to the connector C1, the signal RAS0 is activated when the start address 100000(H) is designated as a write-in address, and as a result, data is written into the start address 100000(H) of the 4-megabyte extended memory 30A or the 2-megabyte extended memory 30B. Therefore, if an extended memory is connected to the connector C1, data written into the start address 100000(H) in the write-in access operation of step 802 is read out in the readout access operation of the step 803 irrespective of whether the connected extended memory is the 4-megabyte extended memory 30A or the 2-megabyte extended memory 30B.

As a result, the CPU 11 recognizes that the extended memory is connected to the connector C1 when it is detected in the comparison process of step 804 that the written-in data and the readout data coincide with each other, and then effects the steps 805 to 808 to determine whether the extended memory connected to the connector C1 is the 4-megabyte extended memory 30A or the 2-megabyte extended memory 30B.

On the other hand, if no extended memory is connected to the connector C1, data cannot be written into the start address 100000(H) and therefore the write-in data to be written into the address 100000(H) in the write-in access operation of step 802 does not coincide with the readout data read out in the readout access operation of step 808. Thus, the CPU 11 recognizes that the extended memory is not connected to the connector C1 when it is detected in the comparison process of step 804 that the write-in data and the readout data do not coincide with each other, effects the step 809 to set "0" or data indicating that no extended memory is connected to the connector C1 into all of the bits of the existence register section ER1 and then completes the identification process.

The identification process for the memory capacity of the extended memory in the steps 805 to 808 is effected as follows.

First, the CPU 11 effects the write-in access operation with respect to the extended memory connected to the connector C1 in cooperation with the memory controller 18 in the step 805 to write preset data into a desired address, for example, address 200000(H) which belongs to a range from the address 200000(H) to the address 2FFFFF(H) which covers the signals RAS2 and RAS3 of the 2-megabyte extended memory 30B.

In a case where the 4-megabyte extended memory 30A is connected to the connector C1, since 2-megabyte address space from the address 100000(H) to the address 2FFFFF(H) is assigned to the signal RAS0 as an effective address range according to the contents of the chip type register section CTR1 and the existence register section ER1, the signal RAS0 is activated when the address 200000(H) is designated by 24-bit memory address, thereby permitting data to be correctly written into the address 200000(H). On the other hand, in a case where the 2-megabyte extended memory 30B is connected to the connector C1, data is written into the start address or the address 100000(H) instead of the address 200000(H). This is because a 2-megabyte address space from the address 100000(H) to the address 2FFFFF(H) is assigned to the signal RAS0 in a case where data indicating the 4-megabyte extended memory 30A is stored in the chip type register section CTR1 and the existence register section ER1 although the address 200000(H) originally belongs to the effective address range assigned to the signal RAS2 in the 2-megabyte extended memory 30B, and therefore the signal RAS0 is activated instead of the signal RAS2 when the address 200000(H) is designated by 24-bit memory address. For this reason, no data is written into the address 200000(H) of the 2-megabyte extended memory 30B. Further, in the 2-megabyte extended memory 30B, an address space from the address 100000(H) to the address 1FFFFF(H) and an address space from the address 200000(H) to the address 2FFFFF(H) are defined by the same repetitive address, and whether the address 100000(H) or address 200000(H) is accessed is determined according to whether the signal RAS0 or RAS2 is activated. Therefore, in a case where the 2-megabyte extended memory 30B is connected to the connector C1, since the signal RAS0 is activated when the address 200000(H) is designated as a write-in address, data is written into the address 100000(H) instead of the address 200000(H).

Next, the CPU 11 accesses for readout to the address 100000(H) or the start address of the extended memory connected to the connector C1 to read out data in cooperation with the memory controller 18 in the step 806, and then effects the step 807 to compare the data read out from the start address in the step 806 with data accessed for write-in to the address 200000(H) in the step 805.

In a case where the 4-megabyte extended memory 30A is connected to the connector C1, data can be correctly written into the address 200000(H) as described above, so that data read out from the start address in the step 806 will not coincide with written data in the address 200000(H). Therefore, when the result of the comparison process shows that data read out from the start address in the step 806 does not coincide with data accessed for write-in to the address 200000(H) in the step 805, the CPU 11 recognizes that the 4-megabyte extended memory 30A is connected to the connector C1, keeps data, which indicates the 4-megabyte extended memory 30A, set in the chip type register section CTR1 and existence register section ER1 completes the identification process.

On the other hand, in a case where the 2-megabyte extended memory 30B is connected to the connector C1, data is written into the start address or address 100000(H) instead of the address 200000(H), so that data read out from the start address in the step 806 may coincide with data accessed for write-in to the address 200000(H) in the step 805. Therefore, when the result of the comparison process in the step 807 shows that data read out from the start address in the step 806 coincides with data accessed for write-in to the address 200000(H) in the step 805, the CPU 11 recognizes that the 2-megabyte extended memory 30B is connected to the connector C1, and effects the step 808. In the step 808, the CPU 11 stores data indicating the 2-megabyte extended memory 30B into the chip type register section CTR1 and existence register section ER1 and then completes the identification process.

In the above example, it is determined whether the 4-megabyte extended memory 30A or 2-megabyte extended memory 30B is connected to the connector C1 according to whether data accessed for write-in to the address 200000(H) and data read out from the address 100000(H) coincide with each other or not. However, the address 2FFFFF(H) and address 1FFFFF(H) can be used instead of the address 200000(H) and address 100000(H), respectively, so as to determine which of the 4-megabyte extended memory 30A and the 2-megabyte extended memory 30B is connected to the connector C1.

The type of the extended memory connected to the connector can be automatically detected by effecting the above identification process by use of the CPU 11.

Not only the identification for identifying the 4-megabyte extended memory 30A and the 2-megabyte extended memory 30B but also the identification for identifying the 5-megabyte extended memory 30C shown in FIG. 11 and the 2-megabyte extended memory 30B can be effected according to the processing operation of the CPU 11 explained with reference to FIG. 13. In this case, it is necessary to set identification data indicating the 5-megabyte extended memory 30C into the chip type register section CTR1 and existence register section ER1 in the step 801.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer including a central processing unit and a connector to which one of first and second extended memories is connected, the connector having pins for outputting first and second row address strobe (RAS) signals, the first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to the first RAS signal when the first RAS signal is activated, the second memory bank being selected in response to the second RAS signal when the second RAS signal is activated, the second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated, the computer comprising:

a memory controller, coupled to said central processing unit, for access-controlling said one of said first and second extended memories connected to said connector;

a first register having first and second information storage regions respectively corresponding to the first and second RAS signals, said first register storing, in each of the first and second information storage regions, chip type information indicating whether a memory bank of an extended memory connected to said connector is constituted by the first DRAM chips or the second DRAM chips;

address range determining means for determining address ranges to be respectively designated by the first and second RAS signals to be output from said connector on the basis of the chip type information stored in said first register;

RAS activation control means for detecting one of the first and second RAS signals to be output from said connector, which designates an address range to which a memory address value output from said central processing unit belongs, and then activating said one of the first and second RAS signals;

means for presuming that the second extended memory is connected to said connector, and storing chip type information in said first register indicating that a bank of an extended memory connected to said connector is constituted by said second DRAM chips;

means for writing write data in a first memory address belonging to the second address range with the first RAS signal activated;

means for reading out read data from a second memory address belonging to the first memory address and corresponding to the first memory address belonging to the second address range with the first RAS signal activated; and means for comparing the write data written in the first memory address and the read data read out from the second memory address, and storing chip type information in said first register indicating that the bank of the extended memory connected to said connector is constituted by the first DRAM chips of the first extended memory, when the write data and the read data are identical.

2. A memory identification method for identifying a type of an extended memory connected to a computer which comprises: a central processing unit; a connector to which one of first and second extended memories is connected, the connector having pins for outputting first and second row address strobe (RAS) signals, the first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to the first RAS signal when the first RAS signal is activated, the second memory bank being selected in response to the second RAS signal when the second RAS signal is activated, the second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated; and a memory controller, coupled to said central processing unit, for access-controlling said one of said first and second extended memories connected to said connector; a first register having first and second information storage regions corresponding to the first and second RAS signals, respectively, said first register storing chip type information in each of the first and second information storage regions, the chip type information indicating whether a memory bank of an extended memory connected to said connector is constituted by the first DRAM chips or the second DRAM chips; address range determining means for determining address ranges to be respectively designated by the first and second RAS signals to be output from said connector on the basis of the chip type information stored in said first register; and RAS activation control means for detecting one of the first and second RAS signals output from said connector, which designates an address range to which a memory address value output from said central processing unit belongs and then activating said one of the first and second RAS signals, the memory identification method comprising the steps of:

presuming that the second extended memory is connected to said connector;

storing chip type information in said first register indicating that a bank of an extended memory connected to said connector is constituted by said second DRAM chips;

executing a write access process for writing write data in a first memory address belonging to the second address range with the first RAS activated;

executing a read access process for reading out read data from a second memory address belonging to the first address range and corresponding to the first memory address belonging to the second address range with the first RAS signal activated;

comparing the write data written in the first memory address and the read data read out from the second memory address with each other; and storing chip type information in said first register indicating that the bank of the extended memory connected to said connector is constituted by the first DRAM chips of the first extended memory, when the write data and the read data are identical to each other.

3. A computer including a central processing unit and a connector to which one of first and second extended memories is connected, the connector having pins for outputting first and second row address strobe (RAS) signals, the first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to the first RAS signal when the first RAS signal is activated, the second memory bank being selected in response to the second RAS signal when the second RAS signal is activated, the second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated, the computer comprising:

a memory controller, coupled to said central processing unit, for access-controlling said one of said first and second extended memories connected to said connector;

a first register having first and second information storage regions respectively corresponding to the first and second RAS signals, said first register storing, in each of the first and second information storage regions, chip type information indicating whether a memory bank of an extended memory connected to said connector is constituted by the first DRAM chips or the second DRAM chips;

a second register having first and second information storage regions respectively corresponding to the first and second RAS signals, said second register storing, in each of the first and second information storage regions, chip presence information indicating whether or not said one of said first extended memory and said second extended memory is connected to said connector;

address range determining means for determining address ranges to be respectively designated by the first and second RAS signals output from said connector on the basis of the chip type information stored in said first register and the presence information stored in said second register;

RAS activation control means for detecting one of the first and second RAS signals to be output from said connector, which designates an address range to which a memory address value output from said central processing unit belongs, and then activating said one of the first and second RAS signals;

means for presuming that the second extended memory is connected to said connector, storing chip type information in said first register indicating that a bank of an extended memory connected to said connector is constituted by said second DRAM chips, and storing chip presence information in said second register indicating that the extended memory is connected to said connector;

means for writing write data in a first memory address belonging to the first address range with the first RAS signal activated;

means for reading out read data from the first memory address with the first RAS signal activated;

means for comparing the write data and the read data, and storing chip presence information indicating that no extended memory is connected to said connector, when the write data and the read data differ from each other;

means for writing write data in a second memory address belonging to the second address range with the first RAS signal activated;

means for reading out read data from a third memory address belonging to the first address range and corresponding to the second memory address belonging to the second address range with the first RAS signal activated; and means for comparing the write data written in the second memory address and the read data read out from the third memory address, and storing chip type information in said first register indicating that the bank of the extended memory connected to said connector is constituted by the first DRAM chips of the first extended memory, when the write data and the read data are identical.

4. A computer according to claim 3, wherein said address range determining means includes first and second address range determining means for respectively determining address ranges to be designated by the first and second RAS signals output from said connector, and each of said first and second address range determining means includes:

a selector for receiving the chip type information and the chip presence information, selecting one of first memory size data and second memory size data on the basis of the chip type information, outputting said one of the first memory size data and the second memory size data as output data, and outputting "0" as the output data when the chip presence information indicates that no extended memory is connected to said connector, the first memory size data representing a storage capacity of each of the first and second memory banks of said first extended memory, the second memory size data representing a storage capacity of said at least one memory bank of said second extended memory; and an adding circuit for adding the output data output from said selector and a start address value of one of the address ranges designated by an associated one of the first and second RAS signals, and outputting an added result as a start address value of one of the address ranges designated by a RAS signal subsequent to said associated one of the first and second RAS signals.

5. A computer according to claim 3, wherein said RAS activation control means includes RAS activation control circuits which are respectively provided for the first and second RAS signals output from said connector, and each of said RAS activation control circuits includes:
- a first comparator for comparing a lower limit value of one of the address ranges designated by an associated one of the first and second RAS signals, for which the RAS activation control circuits are respectively provided, with a memory address value output from said central processing unit;
- a second comparator for comparing an upper limit value of said one of the address ranges with the memory address value output from said central processing unit; and
- a gate circuit for controlling activation of said associated one of the first and second RAS signals on the basis of results of comparisons by said first and second comparators.

6. A memory identification method for identifying a type of an extended memory connected to a computer which comprises: a central processing unit; a connector to which one of first and second extended memories is connected, the connector having pins for outputting first and second row address strobe (RAS) signals, the first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to the first RAS signal when the first RAS signal is activated, the second memory bank being selected in response to the second RAS signal when the second RAS signal is activated, the second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated; a memory controller, coupled to said central processing unit, for access-controlling said one of said first and second extended memories connected to said connector; a first register having first and second information storage regions corresponding to the first and second RAS signals, respectively, said first register storing chip type information in each of the first and second information storage regions, the chip type information indicating whether a memory bank of an extended memory connected to said connector is constituted by the first DRAM chips or the second DRAM chips; a second register having first and second information storage regions corresponding to the first and second RAS signals, respectively, said second register storing, in each of the first and second information storage regions, chip presence information indicating whether or not said one of said first extended memory and said second extended memory is connected to said connector; address range determining means for determining address ranges to be respectively designated by the first and second RAS signals output from said connector on the basis of the chip type information stored in said first register and the chip presence information stored in said second register; and RAS activation control means for detecting one of the first and second RAS signals output from said connector, which designates an address range to which a memory address value output from said central processing unit belongs, and then activating said one of the first and second RAS signals, the memory identification method comprising the steps of:
- presuming that the second extended memory is connected to said connector;
- storing chip type information in said first register indicating that a bank of an extended memory connected to said connector is constituted by said second DRAM chips, and storing chip presence information in said second register indicating that the extended memory is connected to said connector;
- executing a write access process for writing write data in a first memory address belonging to the first address range with the first RAS signal activated;
- executing a read access process for reading out read data from the first memory address with the first RAS signal activated;
- comparing the write data and the read data;
- storing chip presence information indicating that no extended memory is connected to said connector, when the write data and the read data differ from each other;
- executing a write access process for writing write data in a second memory address belonging to the second address range with the first RAS signal activated;
- executing a read access process for reading out read data from a third memory address belonging to the first address range and corresponding to the second memory address belonging to the second address range with the first RAS signal activated;
- comparing the write data written in the second memory address and the read data read out from the third memory address with each other; and
- storing chip type information in said first register indicating that the bank of the extended memory connected to said connector is constituted by the first DRAM chips of the first extended memory, when the write data and the read data are identical.

7. A computer system comprising:
a central processing unit;
a first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to a first row address strobe (RAS) signal when the first RAS signal is activated, the second memory bank being selected in response to a second row address strobe (RAS) signal when the second RAS signal is activated;
a second extended memory having at least one memory bank having a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated;
a connector having pins for outputting the first and second RAS signals, said connector being connected to one of said first and second extended memories;

a memory controller, coupled to said central processing unit, for access-controlling said one of said first and second extended memories connected to said connector;

a first register having first and second information storage regions respectively corresponding to the first and second RAS signals, said first register storing, in each of the first and second information storage regions, chip type information indicating whether a memory bank of an extended memory connected to said connector is constituted by the first DRAM chips or the second DRAM chips;

a second register having first and second information storage regions respectively corresponding to the first and second RAS signals, said second register storing, in each of the first and second information storage regions, chip presence information indicating whether or not said one of said first extended memory and said second extended memory is connected to said connector;

address range determining means for determining address ranges to be respectively designated by the first and second RAS signals output from said connector on the basis of the chip type information stored in said first register and the chip presence information stored in said second register;

RAS activation control means for detecting one of the first and second RAS signals output from said connector, which designates an address range to which a memory address value output from said central processing unit belongs, and then activating said one of the first and second RAS signals;

means for presuming that the second extended memory is connected to said connector, for storing chip type information in said first register indicating that a bank of an extended memory connected to said connector is constituted by said second DRAM chips, and for storing chip presence information in said second register indicating that the second extended memory is connected to said connector;

means for writing write data in a first memory address belonging to the first address range with the first RAS signal activated;

means for reading out read data from the first memory address with the first RAS signal activated;

means for comparing the write data and the read data, and for storing chip presence information indicating that no extended memory is connected to said connector, when the write data and the read data differ from each other;

means for writing write data in a second memory address belonging to the second address range with the first RAS signal activated;

means for reading out read data from a third memory address belonging to the first address range and corresponding to the second memory address belonging to the second address range with the first RAS signal activated; and means for comparing the write data written in the second memory address and the read data read out from the third memory address, and for storing chip type information in said first register indicating that the bank of the extended memory connected to said connector is constituted by the first DRAM chips of the first extended memory, when the write data and the read data are identical.

8. A computer system according to claim 7, wherein said address range determining means includes first and second address range determining means for respectively determining address ranges to be designated by the first and second RAS signals output from said connector, and each of said first and second address range determining means includes:

a selector for receiving the chip type information and the chip presence information, selecting one of a first memory size data and a second memory size data on the basis of the chip type information, outputting said one of the first memory size data and the second memory size data as output data, and outputting "0" as the output data when the chip presence information indicates that no extended memory is connected to said connector, the first memory size data representing a storage capacity of each of the first and second memory banks of said first extended memory, the second memory size data representing a storage capacity of said at least one memory bank of said second extended memory; and an adding circuit for adding the output data output from said selector and a start address value of one of the address ranges which is to be designated by an associated one of the first and second RAS signals, and outputting an added result as a start address value of one of the address ranges designated by a RAS signal subsequent to said associated one of the first and second RAS signals.

9. A computer system according to claim 7, wherein said RAS activation control means includes RAS activation control circuits which are respectively provided for the first and second RAS signals output from said connector, and each of said RAS activation control circuits includes:

a first comparator for comparing a lower limit value of one of the address ranges, designated by an associated one of the first and second RAS signals for which the RAS activation control circuits are respectively provided, with a memory address value output from said central processing unit;

a second comparator for comparing an upper limit value of said one of the address ranges with the memory address value output from said central processing unit; and a gate circuit for controlling activation of said associated one of the first and second RAS signals on the basis of comparison results of said first and second comparators.

10. A computer including a central processing unit and a plurality of connectors each of which has pins for outputting first and second row address strobe (RAS) signals, said each of said connectors being connected to one of first and second extended memories, the first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to the first RAS signal when the first RAS signal is activated, the second memory bank being selected in response to the second RAS signal when the second RAS signal is activated, the second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated, the computer comprising:

a memory controller, coupled to said central processing unit, for access-controlling said one of said first and second extended memories connected to said each of said connectors;

a plurality of first registers which respectively correspond to said connectors and each of which has first and second information storage regions respectively corresponding to the first and second RAS signals, each of said first registers storing, in each of the first and second information storage regions, chip type information indicating whether a memory bank of an extended memory connected to a corresponding one of said connectors is constituted by the first DRAM chips or the second DRAM chips;

a plurality of second registers which respectively correspond to said connectors and each of which has first and second information storage regions respectively corresponding to the first and second RAS signals, said each of said second register storing, in each of the first and second information storage regions, chip presence information indicating whether or not said one of said first extended memory and said second extended memory is connected to a corresponding one of said connectors;

address range determining means for determining address ranges to be respectively designated by the first and second RAS signals output from said each of said connectors on the basis of the chip type information stored in said first registers and the chip presence information stored in said second registers;

RAS activation control means for detecting one of the first and second RAS signals output from said connectors, which designates an address range to which a memory address value output from said central processing unit belongs, and then activating said one of the first and second RAS signals;

means for presuming that the second extended memory is connected to one of said connectors which is to be checked, and storing chip type information in one of said first registers which corresponds to said one of said connectors, indicating that a bank of an extended memory connected to said one of said connectors is constituted by said second DRAM chips, and storing chip presence information in one of said second registers which corresponds to said one of said connectors, indicating that the extended memory is connected to said one of said connectors;

means for writing write data in a first memory address belonging to the first address range with the first RAS signal designating said one of said connectors as activated;

means for reading out read data from the first memory address with the first RAS signal designating said one of said connectors as activated;

means for comparing the write data and the read data and storing chip presence information indicating that no extended memory is connected to said one of said connectors when the write data and the read data differ;

means for writing write data in a second memory address belonging to the second address range with the first RAS signal designating said one of said connectors as activated;

means for reading out read data from a third memory address belonging to the first address range and corresponding to the second memory address belonging to the second address range with the first RAS signal designating said one of said connectors as activated; and means for comparing the write data written in the second memory address and the read data read out from the third memory address, and storing chip type information in said one of said first registers indicating that the bank of the extended memory connected to said one of said connectors is constituted by the first DRAM chips of the first extended memory, when the write data and the read data are identical.

11. A computer according to claim 10, wherein said address range determining means includes first and second address range determining means for respectively determining address ranges designated by the first and second RAS signals output from each of said connectors, and each of said first and second address range determining means includes:

a selector for receiving the chip type information and the chip presence information, selecting one of first memory size data and second memory size data on the basis of the chip type information, outputting the selected first memory size data and the second memory size data as output data, and outputting "0" as the output data when the chip presence information indicates that no extended memory is connected to said each of said connectors, the first memory size data representing a storage capacity of each of the first and second memory banks of said first extended memory, the second memory size data representing a storage capacity of said at least one memory bank of said second extended memory; and an adding circuit for adding the output data output from said selector and a start address value of one of the address ranges designated by an associated one of the first and second RAS signals, and outputting an added result as a start address value of one of the address ranges designated by a row address strobe (RAS) signal subsequent to said associated one of the first and second RAS signals.

12. A computer according to claim 10, wherein said RAS activation control means includes RAS activation control circuits which are respectively provided for the first and second RAS signals output from said each of said connectors, and each of said RAS activation control circuits includes:

a first comparator for comparing a lower limit value of one of the address ranges, designated by an associated one of the first and second RAS signals for which the RAS activation control circuits are respectively provided, with a memory address value output from said central processing unit;

a second comparator for comparing an upper limit value of said one of the address ranges with the memory address value output from said central processing unit; and a gate circuit for controlling activation of said associated one of the first and second RAS signals on the basis of results of comparison by said first and second comparators.

13. A memory identification method for identifying a type of an extended memory connected to a computer which comprises: a central processing unit; a plurality of connectors each of which has pins for outputting first and second row address strobe signals, each of said connectors being connected to one of first and second extended memories, the first extended memory having first and second memory banks each of which includes a plurality of first DRAM chips, and to which first and second address ranges corresponding to memory capacities of the first and second memory banks are respectively assigned, the first and second address ranges being defined by same repetitive addresses, the first memory bank being selected in response to the first RAS signal when the first RAS signal is activated, the second memory bank being selected in response to the second RAS signal when the second RAS signal is activated, the second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated; a memory controller, coupled to said central processing unit, for access-controlling said one of said first and second extended memories connected to said each of said connectors; a plurality of first registers respectively corresponding to said connectors and each of which has first and second information storage regions respectively corresponding to the first and second RAS signals, each of said first registers storing chip type information in each of the first and second information storage regions, the chip type information indicating whether a memory bank of an extended memory connected to a corresponding one of said connectors is constituted by the first DRAM chips or the second DRAM chips; a plurality of second registers which respectively correspond to said connectors and each of which has first and second information storage regions respectively corresponding to the first and second RAS signals, each of said second registers storing, in each of the first and second information storage regions, chip presence information indicating whether or not said one of said first extended memory and said second extended memory is connected to a corresponding one of said connectors; address range determining means for determining address ranges to be respectively designated by the first and second RAS signals output from each of said connectors on the basis of the chip type information stored in said first registers and the chip presence information stored in said second registers; and RAS activation control means for detecting one of the first and second RAS signals output from said connectors, which designates an address range to which a memory address value output from said central processing unit belongs, and then activating said one of the first and second RAS signals, the memory identification method comprising the steps of:

presuming that the second extended memory is connected to one of said connectors to be checked, and storing chip type information in one of said first registers which corresponds to said one of said connectors indicating that a bank of an extended memory connected to said one of said connectors is constituted by said second DRAM chips, and storing chip presence information in one of said second registers which corresponds to said one of said connectors indicating that the extended memory is connected to said one of said connectors;

executing a write access process for writing write data in a first memory address belonging to the first address range with the first RAS signal designating said one of said connectors as activated;

executing a read access process for reading out read data from the first memory address with the first RAS signal designating said one of said connectors as activated;

comparing the write data and the read data, and storing chip presence information indicating that no extended memory is connected to said one of said connectors when the write data and the read data differ;

executing a write access process for writing write data in a second memory address belonging to the second address range with the first RAS signal designating said one of said connectors as activated;

executing a read access process for reading out read data from a third memory address belonging to the first address range and corresponding to the second memory address belonging to the second address range with the first RAS signal designating said one of said connectors as activated; and comparing the write data written in the second memory address and the read data read out from the third memory address, and storing chip type information in one of said first registers which corresponds to said one of said connectors, indicating that the bank of the extended memory connected to said one of said connectors is constituted by the first DRAM chips of the first extended memory, when the write data and the read data are identical.

14. A computer system comprising:

a central processing unit;

a first extended memory having first and second memory banks each of which includes a plurality of first DRAM chips, and to which first and second address ranges corresponding to memory capacities of the first and second memory banks are assigned, respectively, the first and second address ranges being defined by same repetitive addresses, the first memory bank being selected in response to a first row address strobe (RAS) signal when the first RAS signal is activated, the second memory bank being selected in response to a second row address strobe (RAS) signal when the second RAS signal is activated;

a second extended memory having at least one memory bank which has a memory capacity equal to or larger than the total memory capacity of the first and second memory banks, which includes a plurality of second DRAM chips differing in configuration from the first DRAM chips, to which the first and second address ranges are assigned, and which is selected when the first RAS signal is activated;

a plurality of connectors each of which has pins for outputting the first and second RAS signals, each of said connectors being connected to one of said first and second extended memories;

a memory controller, coupled to said central processing unit, for access-controlling said one of said first and second extended memories which is connected to said each of said connectors;

a plurality of first registers which respectively correspond to said connectors and each of which has first and second information storage regions respectively corresponding to the first and second RAS signals, each of said first registers storing, in each of the first and second information storage regions, chip type information indicating whether a memory bank of an extended memory connected to a corresponding one of said connectors is constituted by the first DRAM chips or the second DRAM chips;

a plurality of second registers which respectively correspond to said connectors and each of which has first and second information storage regions respectively corresponding to the first and second RAS signals, said each of said second registers storing, in each of the first and second information storage regions, chip presence information indicating whether or not said one of said first extended memory and said second extended memory is connected to a corresponding one of said connectors;

address range determining means for determining address ranges respectively designated by the first and second RAS signals output from said each of said connectors on the basis of the chip type information stored in said first registers and the chip presence information stored in said second registers;

RAS activation control means for detecting one of the first and second RAS signals to be output from said connectors, which designates an address range to which a memory address value output from said central processing unit belongs, and then activating said one of the first and second RAS signals;

means for presuming that the second extended memory is connected to one of said connectors to be checked, and storing chip type information in one of said first registers which corresponds to said one of said connectors, indicating that a bank of an extended memory connected to said one of said connectors is constituted by said second DRAM chips, and storing chip presence information in one of said second registers which corresponds to said one of said connectors indicating that the second extended memory is connected to said one of said connectors;

means for writing write data in a first memory address belonging to the first address range with the first RAS signal designating said one of said connectors as activated;

means for reading out read data from the first memory address with the first RAS signal designating said one of said connectors as activated;

means for comparing the write data and the read data, and storing chip presence information indicating that no extended memory is connected to said one of said connectors when the write data and the read data differ;

means for writing write data in a second memory address belonging to the second address range with the first RAS signal designating said one of said connectors as activated;

means for reading out read data from a third memory address belonging to the first address range and corresponding to the second memory address belonging to the second address range with the first RAS signal designating said one of said connectors as activated; and means for comparing to the write data written in the second memory address and the read data read out from the third memory address and storing chip type information in said one of said first registers indicating that the extended memory connected to said one of said connectors is constituted by the first DRAM chips of the first extended memory when the write data and the read data are identical.

* * * * *